United States Patent [19]

Noh et al.

[11] Patent Number: 4,607,651

[45] Date of Patent: Aug. 26, 1986

[54] AUTOMATIC SET-UP SYSTEM

[75] Inventors: Akihiko Noh, Chigasaki; Yoshiaki Saijo, Yokohama; Shinichi Sato, Kawasaki; Ichiro Tanaka, Sagamihara, all of Japan

[73] Assignee: Tokyo Shibaura Denki Kabushiki Kaisha, Kawasaki, Japan

[21] Appl. No.: 744,699

[22] Filed: Jun. 14, 1985

Related U.S. Application Data

[62] Division of Ser. No. 581,417, Feb. 17, 1984, Pat. No. 4,543,970.

[30] Foreign Application Priority Data

Feb. 21, 1983 [JP] Japan ................................. 58-26236
Oct. 18, 1983 [JP] Japan ................................ 58-195073
Oct. 18, 1983 [JP] Japan ................................ 58-195076

[51] Int. Cl.⁴ ............................................. B08B 3/00
[52] U.S. Cl. ....................................... 134/62; 134/66; 134/76; 134/140; 269/20; 269/56; 269/309; 414/676
[58] Field of Search ...................... 134/44, 52, 61, 62, 134/66, 76, 78, 115, 137, 140, 156; 269/20, 56, 93, 309, 310; 414/676, 751; 15/21 R, 21 B, 21 C, 21 E

[56] References Cited

U.S. PATENT DOCUMENTS

| | | | |
|---|---|---|---|
| 672,788 | 4/1901 | Lieber et al. | 134/76 X |
| 2,159,000 | 5/1939 | Alling | 134/62 X |
| 2,621,667 | 12/1952 | Lathrop | 134/52 X |
| 3,209,623 | 10/1965 | Schardt | 269/20 X |
| 3,675,665 | 7/1972 | Sadwith | 134/62 X |
| 3,693,965 | 9/1972 | Mitsengendler | 269/20 |
| 3,854,889 | 12/1974 | Lemelson . | |
| 4,035,904 | 7/1977 | Ishizaka et al. . | |
| 4,489,926 | 12/1984 | Blatrix | 269/93 |

FOREIGN PATENT DOCUMENTS

| | | | |
|---|---|---|---|
| 0002782 | 7/1979 | European Pat. Off. . | |
| 0068674 | 5/1983 | European Pat. Off. . | |
| 205039 | 12/1982 | Japan | 269/56 |
| 1009540 | 4/1983 | U.S.S.R. | 134/61 |

Primary Examiner—Harvey C. Hornsby
Assistant Examiner—Frankie L. Stinson
Attorney, Agent, or Firm—Cushman, Darby & Cushman

[57] ABSTRACT

An automatic set-up system is provided for setting up on a pallet work to be machined by a flexible manufacturing system automatic machine tool. The pallet has a support plate and a jig plate which overlies the support plate on which the work is placed. The support plate, the jig plate and the work are sequentially conveyed by a convey unit on a setting table. The relative positions of the support plate and the jig plate, and of the jig plate and the work are usually held constant by the engagement of positioning recesses and positioning pins. Even if the position of the jig plate or the work conveyed by the convey unit deviates from a predetermined position, a float base and a support plate (the float base, the support plate, and the jig plate) are floated by means of air bearing pads. The horizontal movement of these components can be readily controlled, so that positioning pins can be easily fitted in the positioning recesses. A clamp is mounted on the jig plate by a setting robot; and the clamp is clamped by a nut runner so that the work is fixed to the pallet. The machined work and the pallet are automatically cleaned by a cleaner; and the clamp is removed from the work resting on the setting table. Finally, the work is removed from the pallet.

6 Claims, 35 Drawing Figures

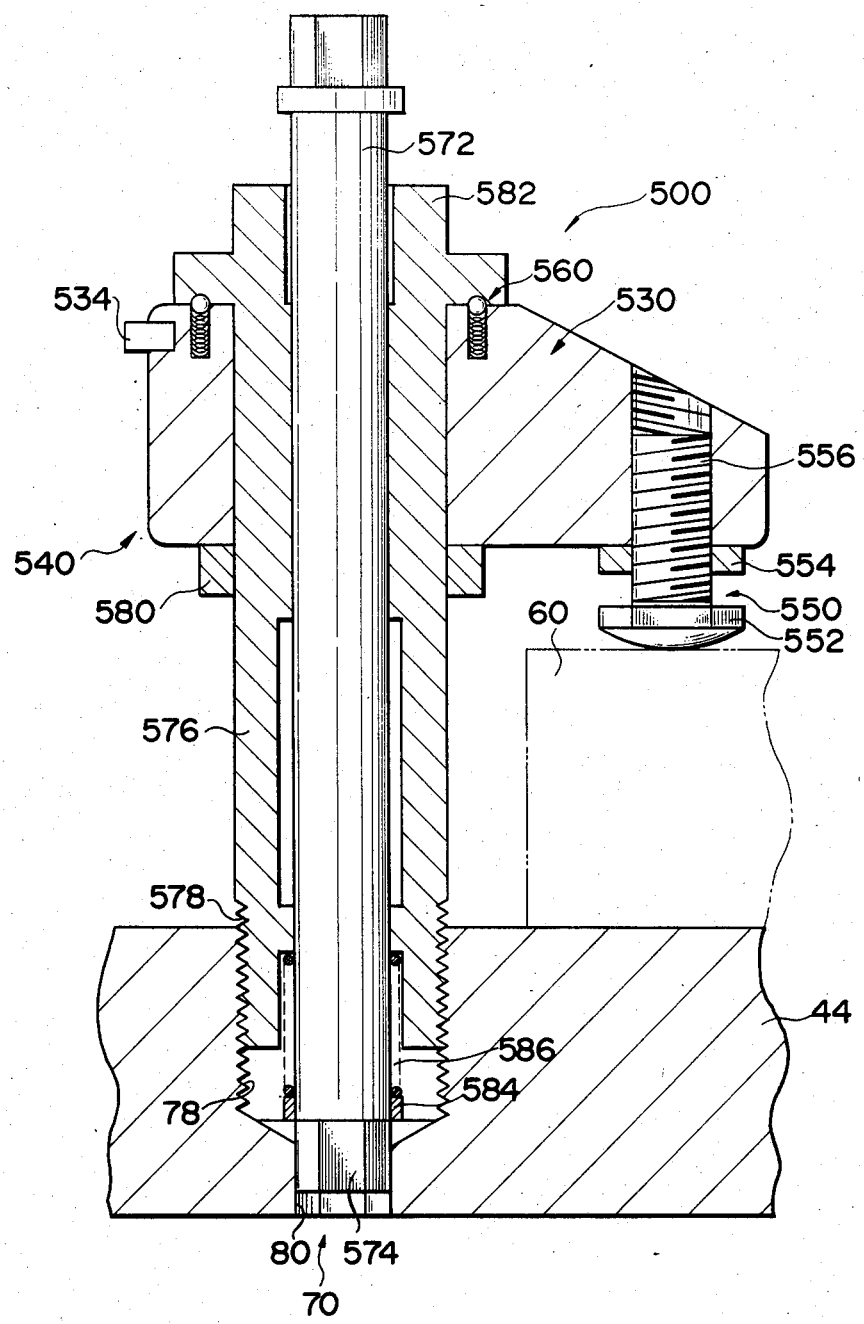

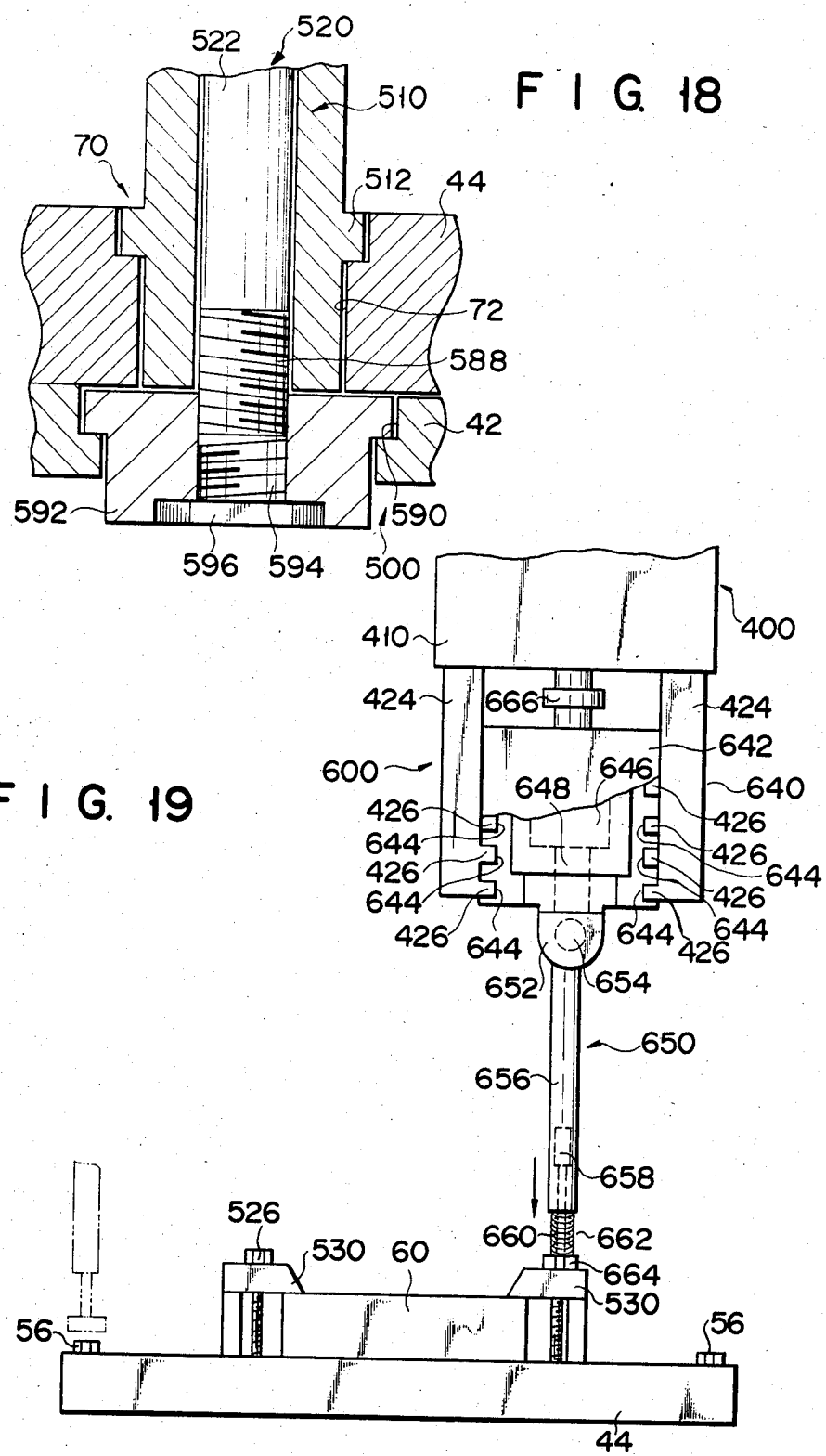

F I G. 22
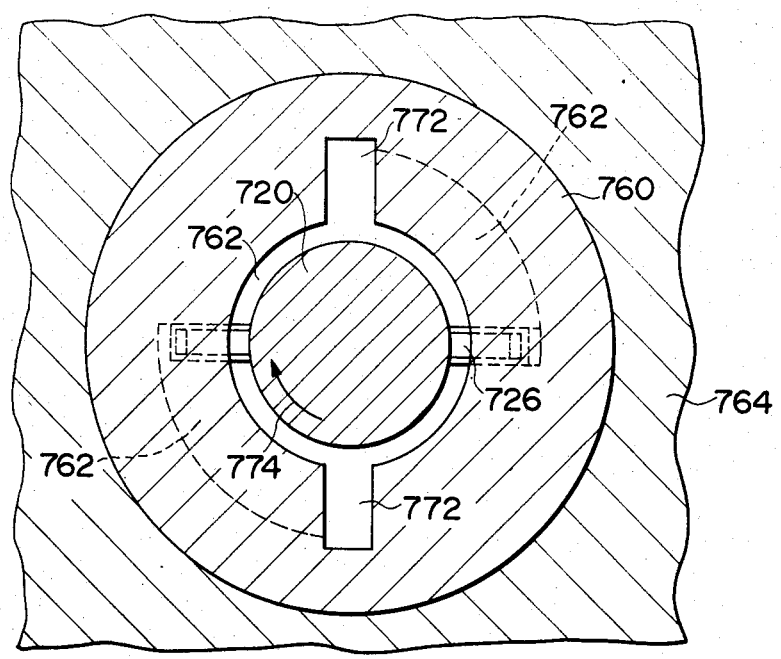
F I G. 23
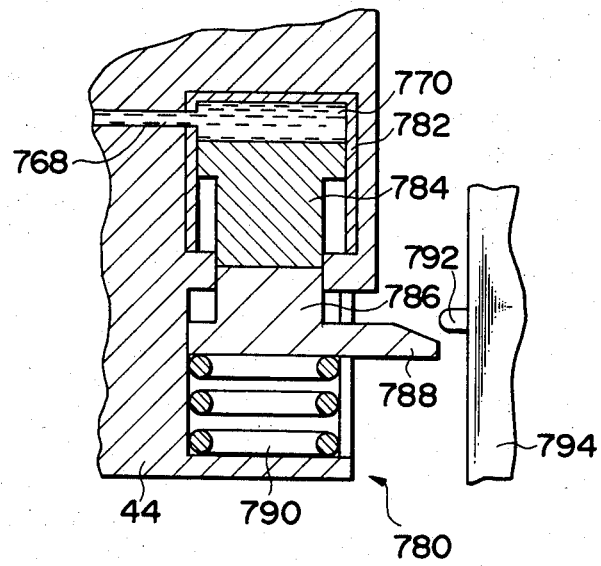

F I G. 31
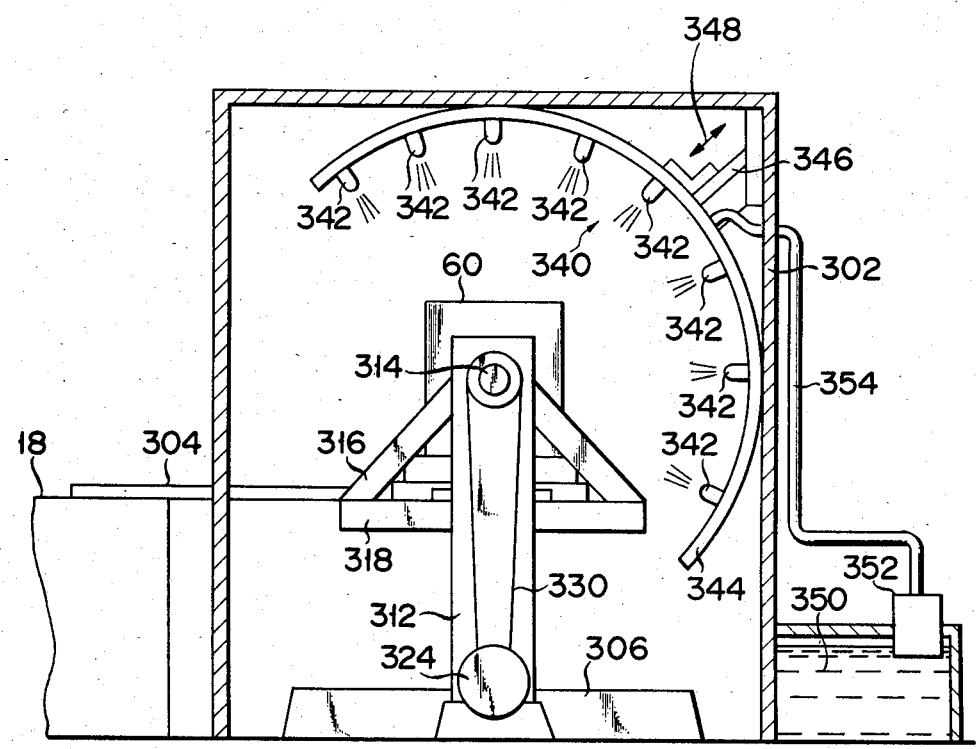

AUTOMATIC SET-UP SYSTEM

This is a division of application Ser. No. 581,417, filed Feb. 17, 1984, now U.S. Pat. No. 4,543,970.

BACKGROUND OF THE INVENTION

The present invention relates to an automatic set-up system for a flexible manufacturing system (to be referred to as an FMS hereinafter) and, more particularly, to a fully automatic set-up system for automatically performing set-up operations such as loading work on a pallet, cleaning processed work and the pallet, and unloading processed work from the pallet.

In a mechanical manufacturing line to which an FMS is applied, a predetermined work is selected from works which have different sizes and shapes and which are stored in an automated warehouse. The selected work is placed and fixed by the set-up system on a pallet. The work on the pallet is conveyed by an unmanned vehicle or conveyer to a machining line having a plurality of automated machine tools. The work which is subjected to predetermined machining by means of a predetermined machine tool is returned by the unmanned vehicle to the set-up system. Chips and dust are removed from the work, and the work is removed from the pallet. The finished work is stacked in the automated warehouse, and new work is loaded on the pallet.

In the conventional FMS, feeding the work between the set-up system and the machining line, and loading-/unloading of the pallet having the work thereon (with respect to the machine tool line) can be automated. However, the set-up operations (e.g., loading/unloading) with respect to the pallet must be manually performed since the work itself has different shapes and sizes. In an FMS for small scale production of a variety of items, the structure, shape and size of the work variously changes, and many types of clamp jigs for fixing the work on the pallets is required. It is therefore impossible to precisely load different work at the predetermined positions of the pallet at a low cost in accordance with the conventional robot techniques. As a result, the set-up operations cannot be automated. Yet, manual set-up operations are cumbersome, timeconsuming and result in inefficiency. As a result, the utilization efficiency of the machine tools is degraded. The chips and dust must also be removed from the work and the pallet manually by spraying with compressed air. In this manner, manual set-up operations result in the inefficiency of the production process and present problems of safety and reliablity.

SUMMARY OF THE INVENTION

It is an object of the present invention to provide an automatic set-up system for automatically performing all set-up operations such as loading work on a pallet, cleaning the processed work and the pallet, and unloading the processed work from the pallet.

It is another object of the present invention to provide an automatic set-up system which is capable of efficiently performing the set-up operations with high precision and efficiency.

According to the present invention, there is provided an automatic set-up system for automatically setting up work to be processed by an automated machine tool of the flexible manufacturing system.

The automatic set-up system comprises: a pallet on which a work is loaded; a setting table which supports the pallet on which the work is loaded; a transfer mechanism having grip means which sequentially grips and conveys the pallet and the work on the setting table; a clamp mounted on the pallet to fix the work on the pallet; a cleaner for cleaning the work and pallet which are fixed together by the clamp; and feeding means for delivering the work and pallet which are fixed together by the clamp to the automated machine tool and for feeding the work and the pallet from the automated machine tool to the cleaner.

According to the present invention, all set-up operations are automated such that the work is placed on the pallet, a clamp is mounted on the pallet, the work is clamped and fixed by the clamp on the pallet, the clamped work and the pallet are delivered together by the delivering means to the automated machine tool, and the processed work and the pallet are fed together by the feeding means from the automated machine tool to the cleaner so as to clean the processed work and the pallet. The cleaned work and pallet are automatically disassembled on the setting table. The set-up operations can be effectively performed with high precision, thereby contributing to automated manufacturing.

BRIEF DESCRIPTION OF THE DRAWINGS

FIG. 17 is a longitudinal sectional view showing a modification of the mechanical clamp 500;

FIG. 18 is a partial longitudinal sectional view showing another modification of the mechanical clamp 500;

FIG. 19 is a side view showing a modification of the nut runner 600;

FIG. 22 is a cross-sectional view of the hydraulic clamp 700 taken along the line 22—22 of FIG. 21;

FIG. 23 is a longitudinal sectional view of a clamp force detecting means 780;

FIG. 31 is a side view showing the internal construction of a cleaner 300;

DETAILED DESCRIPTION OF THE PREFERRED EMBODIMENTS

Figure 1:
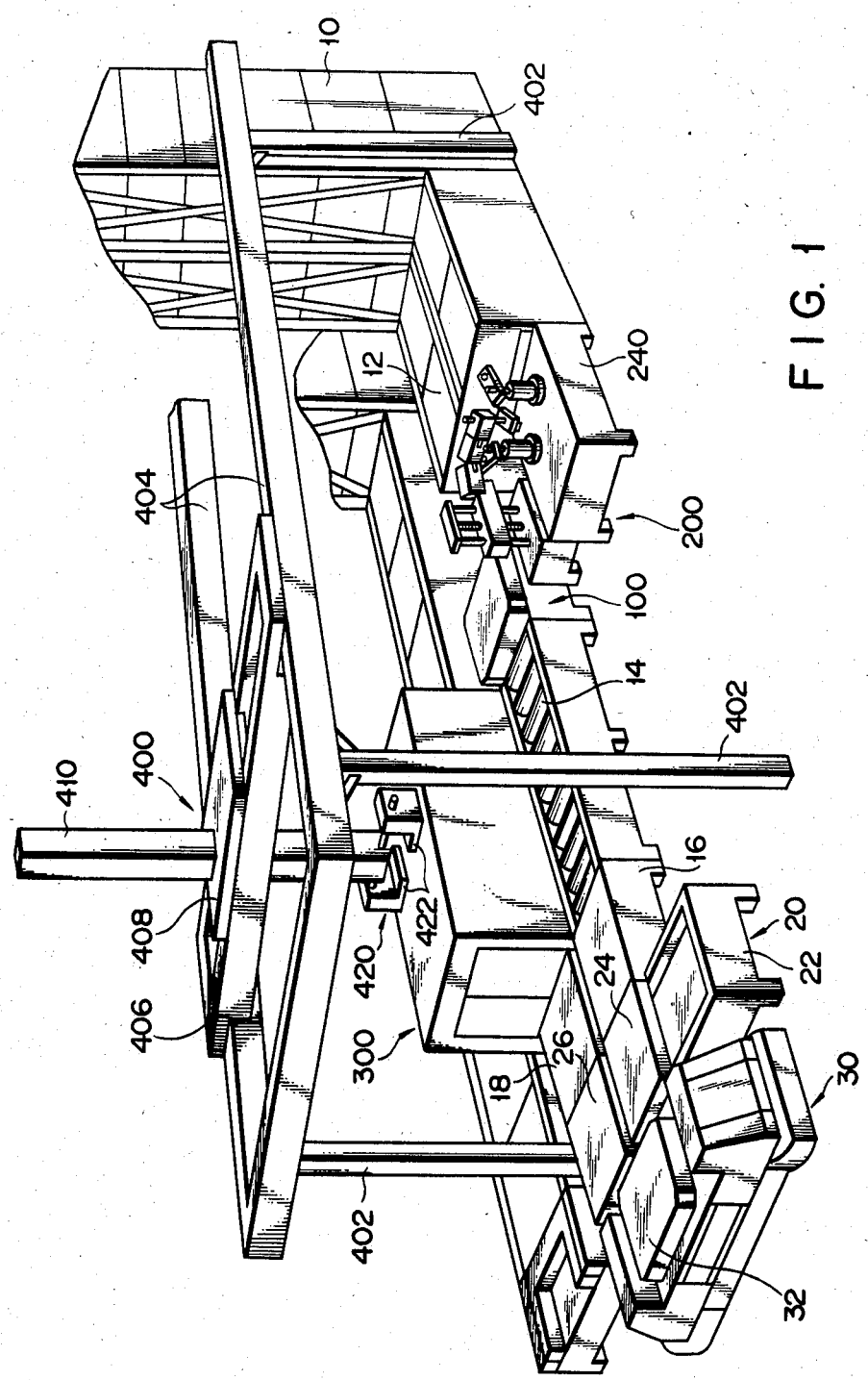
FIG. 1 is a perspective view showing the overall configuration of an automatic set-up system according to the present invention.

The arrangement of components of an automatic set-up system according to the present invention will be described with reference to the overall view shown in FIG. 1. Preprocessed work, processed work, and different pallets whose shapes are determined in accordance with the shape of each type of work are stored in an automated warehouse 10. The pallet has a support plate and a jig plate (to be described in detail later). The jig plate overlies the support plate. The work is placed on the jig plate. The work and the pallet are fixed together through the jig plate, so that the work is mounted on the automatic machine tool by using the pallet. Roller conveyers 12 are disposed in front of the automated warehouse 10. A predetermined work and a corresponding pallet which are determined in accordance with production management schedule are taken out by a stacker crane from the automated warehouse 10 and are placed on the roller conveyer 12. The stacker crane removes from the automated warehouse 10 the support plate, the jig plate and the work in that order. These are conveyed forward by the roller conveyer 12. A setting table 100 is disposed in front of the roller conveyer 12. A roller table 14 is disposed in front of the setting table 100. Furthermore, a shuttle table 20 is disposed in front of the roller table 14 through a stand 16 such that moving members 24 and 26 of the shuttle table 20 are disposed to be perpendicular to the convey direction of the roller table 14. Furthermore, an unmanned vehicle 30 is in front of the shuttle table 20. The unmanned vehicle 30 can move along the front edge of the shuttle table 20. A setting robot 200 is disposed at one side of the setting table 100. A cleaner 300 is disposed at the side of the roller table 14.

A convey unit 400 is installed above the setting table 100, the roller conveyer 14, the shuttle table 20, the cleaner 300, and so on. The convey unit 400 has columns 402 extending upward from the floor and a substantially horizontal framework supported by the upper ends of the columns 402. A pair of members of the framework which extend directly above the convey direction of the roller table 14 to serve as guide rails 404. A travel member 406 is movably supported across the guide rails 404, so that the travel member 406 can be moved along the guide rails 404. A lateral moving member 408 is supported on the travel member 406, so that the lateral moving member 408 can be moved between the opposing guide rails 404 (i.e., along the longitudinal direction of the travel member). A lift member 410 is disposed on the lateral moving member 408 to be vertically movable. A grip means 420 is mounted at the lower end of the lift member 410. The travel member 406 and the lateral moving member 408 are driven by separate drive units (not shown), respectively. The lift member 410 is vertically driven by a drive unit (not shown). The grip means 420 has a pair of grip members 422. These grip members 422 can open and close to manipulate objects as needed. When the grip members 422 close together, they firmly grip the objects (work, pallet, etc.). However, when the grip members 422 separate, they release the objects. In summary, the convey unit 400 can perform a number of functions. It moves back-and-forth; it moves laterally; and it lifts and grips in order to convey the work and the like within a region determined by the strokes of the back-and-forth and lateral movement.

The support plate, the jig plate and the work are conveyed forward by the roller conveyer 12 and are placed on the setting table 100 by the convey unit 400. The setting robot 200 sets the clamp on the jig plate placed on the support plate, as will be described later. The grip means 420 of the convey unit 400 supports and grips the nut runner (to be described later with reference to FIGS. 16 and 19), so that the nut runner tightens the clamp to fix the work on the pallet. The work is fixed together with the pallet. The work and the pallet are conveyed along the roller table 14 and are temporarily placed on the stand 16. The work and the pallet are moved from the stand 16 to the moving member 24 of the shuttle table 20. The shuttle table 20 has a base 22 extending along the direction perpendicular to the convey direction of the roller table 14, and the moving members 24 and 26 which can be moved along the extended direction of the base. When the moving member 24 is located at a position (substantially the center of the base 22) to align with the stand 16, the work and the pallet are transferred from the stand 16 to the moving member 24. The unmanned vehicle 30 stops at the position where the stand 32 is aligned with the moving member 24 at substantially the center of the base 22. The work and pallet are transferred from the moving member 24 to the stand 32 of the unmanned vehicle 30. Movement of the work and the pallet from the stand 16 to the moving member 24 and from there to the stand 32 can be performed by pushing levers (not shown) arranged in the stand 16 and the moving member 24.

The work and the pallet are conveyed by the unmanned vehicle 30 to a machining line along which various automatic machine tools such as lathes and drilling machines are aligned. The work is set in the automatic machine tool determined in accordance with the type of machining by using the pallet. The processed work is placed together with the pallet on the unmanned vehicle 30. The work is then conveyed by the unmanned vehicle 30 and returns to substantially the central portion of the side of the shuttle table 20. In other words, the moving member 26 of the shuttle table 20 is moved to substantially the central position of the base 22 so as to align with the stand 16. The processed work and the pallet are moved from the stand 32 to the moving member 26. The moving member 26 is then moved to the position to align with the stand 18 disposed in front of the cleaner 300, and the work and the pallet are moved from the moving member 26 to the stand 18. The work and pallet which are covered with cutting chips and dust are inserted in and cleaned by the cleaner 300. After the work and the pallet are cleaned, they are moved to the moving member 26 through the stand 18. The moving member 26 is moved at substantially the center of the base 22, and the work and the pallet are transferred from the moving member 26 to the stand 16. The work and the pallet which have been cleaned are moved from the stand 16 to the roller table 14 and are placed on the setting table 100. If desired, separate table can be disposed at the end of the cleaner 300 opposite to the side where the stand 18 is positioned. In this case, the cleaned work and the pallet may be fed out of the rear side of the cleaner 300 and may be transferred directly to the setting table 100 through this separate table. The nut runner gripped by the grip means 420 removes the clamp from the jig plate, thereby disassembling the work and the pallet. The setting robot 200 transfers the clamp from the jig plate to the jig table 240, so that the clamp is held on the jig table 240. The work and the pallet are transferred by the convey unit 400 from the setting table 100 to the roller conveyer 12. The work and the pallet reach the rear end of the roller conveyer 12 and are stored by the stacker crane in the automated warehouse 10. However, in order to load the work to be set up on the cleaned pallet, the pallet is left on the setting table. The pallet is then used to set up the next work.

Figure 2:
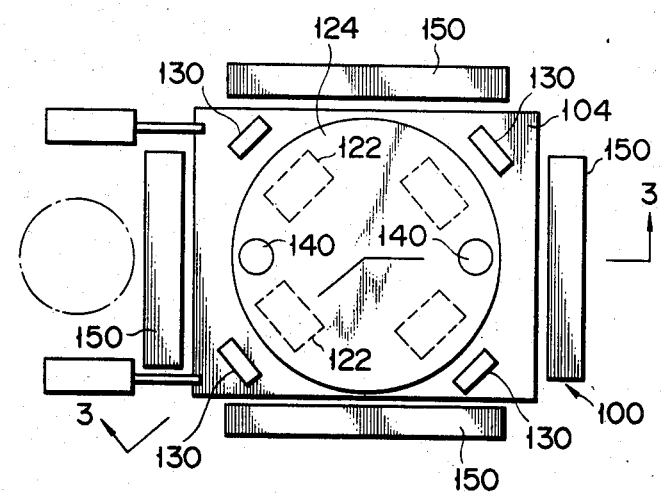
FIG. 2 is a plan view of a setting table 100 of the system shown in FIG. 1.
Figure 3:
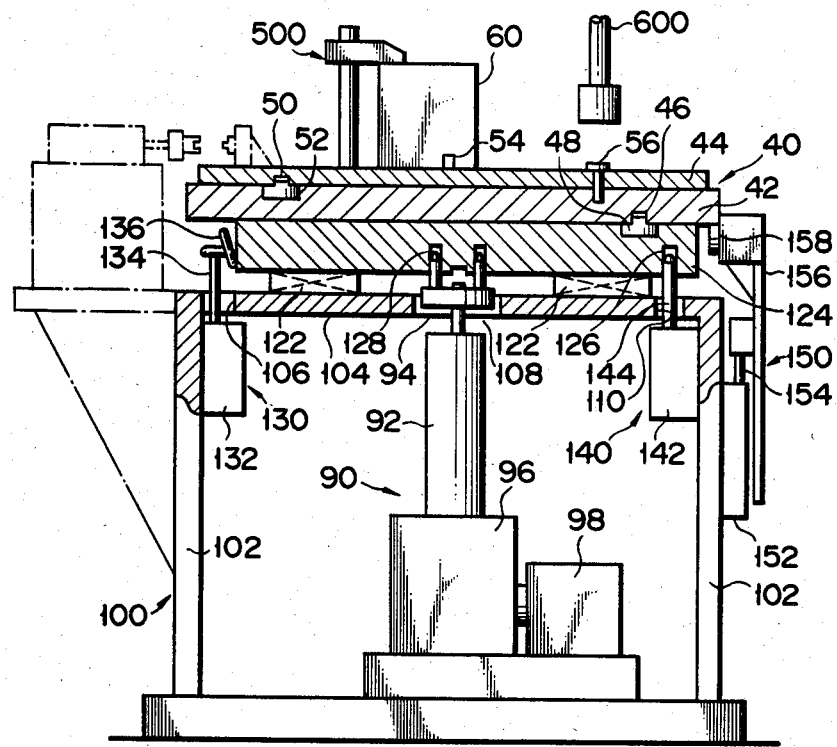
FIG. 3 is a longitudinal sectional view of the system taken along the line 3—3 of FIG. 2.

The setting table 100 will be described in detail with reference to the plan view in FIG. 2 and the sectional view in FIG. 3 when taken along the line 3—3 of FIG. 2. The frame of the setting table 100 has side plates 102 and an upper plate 104 which is supported at the upper ends of the side plates 102. Four air bearing pads 122 are fixed on the upper surface of the upper plate 104. Compressed air is supplied from a compressing air source (not shown) to the air bearing pads 122. The compressed air is blown upward from the air bearing pads 122. A disk-shaped float base 124 is disposed on the air bearing pads 122. The float base 124 slightly floats in the air when compressed air blows from the air bearing pads 122.

A circular hole 108 is formed at the center of the upper plate 104. A rotating means 90 of the float base 124 is disposed at substantially the center of the frame consisting of the side plates 102 and the upper plate 104. The rotating means 90 has an index unit 96 disposed below the hole 108, a rotating shaft 92 extending upward and supported by the index unit 96 to be vertically movable, and a motor 98 for rotating the rotating shaft 92 at angular intervals of 90 degrees through the index unit 96. A coupling 94 is detachably mounted on the upper end of the rotating shaft 92. The coupling 94 has upwardly extending projections. When the rotating shaft 92 is located at the upper end position, the coupling 94 extends upward through the hole 108. However, when the rotating shaft 92 is located at the lower end position, the coupling 94 is withdrawn below the upper plate 104. Recesses 128 are formed in the lower surface portion of the float base 124 which matches with the coupling 94, so that the projections of the coupling 94 are respectively fitted in the recesses 128. When the rotating shaft 92 is located at the upper end position, the projections of the coupling 94 are respectively fitted in the recesses 128. When the motor 98 is rotated while the float base 124 is floating, the rotating shaft 92 is rotated, and the float base 124 is rotated through the coupling 94.

Four centering means 130 are disposed each at an equal angle within the four corners of the upper plate 104 so that they are arranged symmetrically about the rotational center of the float base 124 which is determined by the rotating shaft 92. Each centering means 130 has an air cylinder 132 fixed on the inner surface of the upper end of the corresponding side plate 102 with a spindle 134 that extends upward. Holes 106 are formed in the upper plate 104 to correspond to the position of the spindles 134 so they can pass through. Abutment plates 136 made of an elastic material are mounted on the upper ends of the spindles 134, respectively, so that the lower end portions of the abutment plates 136 are inclined toward the rotational center of the float base 124. When the spindles 134 of the air cylinders 132 are withdrawn, the abutment plates 136 also withdraw into the holes 106. However, when the spindles 134 extend upward, the abutment plates 136 remain level with the side surface of the float base 124. The rotational center of the float base 124 substantially coincides with that of the rotating shaft 92 while each abutment plate 136 abuts against the side wall of the float base 124.

A pair of positioning means 140 are disposed at opposing positions with respect to the rotational center of the rotating shaft 92. Each positioning means 140 has an air cylinder 142 fixed on the inner surface of the upper end of the corresponding side plate 102 so that a spindle 144 of the positioning means 140 can extend upward. Holes 110 are formed in portions of the upper plate 104 to correspond to the spindles 144, so that the spindles 144 can pass through the holes 110. Each spindle 144 has a frustum-shaped portion at its upper end. Two pairs of positioning recesses 126 are formed in the lower surface of the float base 124 at equal angles with respect to the rotational center of the float base 124. When the air cylinders 142 are actuated to extend the spindles 144, the spindles 144 are inserted in one of the pairs of recesses 126. In this case, each spindle is inserted in the corresponding recess 126 in such a way that the frustum-shaped portion at the upper end of the spindle 144 is guided into the corresponding recess 126. Therefore, even if the position of the spindle 144 is slightly deviated from that of the corresponding recess 126, the spindle 144 can be properly fitted in the corresponding recess 126. The spindle 144 has a diameter large enough to not excessively move the spindle in the recess 126. Thus, the horizontal direction of the float base 124 with respect to the upper plate 104 is precisely preset when the spindles 144 are inserted in the corresponding recesses 126. Since two pairs of positioning recesses 126 are provided, the float base 124 can be indexed at two angular positions which are 90 degrees apart from each other in accordance with a combination of the spindles 144 and the positioning recesses 126.

Two pairs of pallet seat means 150 are disposed such that one pair of the pallet support means opposes each other along a direction perpendicular to that of the other pair with respect to the rotating shaft 92. The pallet seat means 150 has a hydraulic cylinder 152 fixed on the outer surface of the side plate 102 so that a piston rod 154 of the cylinder 152 extends upward. A lifter 156 is mounted on the piston rod 154 so that the longitudinal direction of the lifter 156 is aligned with that of the piston rod 154. A plurality of rollers 158 is mounted on the upper end portion of the lifter 156 to receive a support plate 42 of the pallet 40 and is rotatable with respect to the lifter 156.

The pallet 40 has a support plate 42 and a jig plate 44 which overlies the support plate 42. The support plate 42 is mounted on a predetermined mounting member of an automatic machine tool (not shown) when work 60 is set in this automatic machine tool. For this reason, the support plate 42 has a shaped based on that of the mounting member. Each support plate 42 has a predetermined shape and a predetermined size. On the other hand, the work 60 is mounted on a jig plate 44, so that the jig plate 44 has a shape determined by the shape of the work. Since each work 60 has a different shape, each jig plate 44 has a different shape. A clamp 500 fixes the work 60 mechanically on the jig plate 44 after the work 60 is placed on the jig plate 44. A clamping means for fixing the work 60 on the jig plate 44 can comprise, a hydraulic or magnetic clamping means, as will be described later, except for the clamp 500. For example, when the work 60 is hydraulically clamped, hydraulic piping is provided in the jig plate 44. In this manner, the jig plate 44 varies in accordance with the type of clamping technique.

At least two positioning pins 48 are disposed on the upper surface of the float base 124 so as to extend upward therefrom. Positioning recesses 46 are formed in the lower surface portions of the support plate 42 which are respectively aligned with the positioning pins 48. The relative positional relationship between the float base 124 and the support plate 42 is held to be constant while the positioning pins 48 are fitted in the positioning recesses 46. At least two positioning pins 52 extend upward from the upper surface of the support plate 42. Positioning recesses 50 are formed in the lower surface of the jig plate 44 so as to respectively match with the positioning pins 52. The relative positional relationship between the support plate 42 and the jig plate 44 is held to be constant while the positioning pins 52 are fitted in the positioning recesses 50. Each of the distal ends of the positioning pins 48 and 52 is a frustum, so that the positioning pins 48 and 52 can be smoothly fitted in the positioning recesses 46 and 50, respectively. The support plate 42 and the jig plate 44 are fixed by at least two bolts 56, while the positioning pins 52 are fitted in the positioning recesses 50, respectively. Pins 54 are formed on the upper surface of the jig plate 44 and are fitted in the recesses formed on the lower surface of the work 60, thereby fixing the work 60 at a predetermined position of the jig plate 44. A plurality of setting holes 70 to be described later is formed on the upper surface of the jig plate 44. The clamp 500 is set by the setting robot in the predetermined setting holes 70 in accordance with the shape of the work 60.

The operation of the setting table 100 having the construction described above will next be described. The lifter 156 is lifted upon operation of the hydraulic cylinder 152 and the rollers 158 which are located at the upper end position. Compressed air is not yet supplied to the air bearing pads 122 which supports the float base 124. The support plate 42 of the pallet 40 is conveyed along the roller conveyer 12 to its front end position. The support plate 42 is placed by the grip means 420 of the convey unit 400 on the rollers 158 of the pallet seat means 150. Compressed air is then supplied from the compressed air source to the air bearing pads 122, and the floating base 124 starts floating. The rotating shaft 92 is moved downward disengaging the projections of the coupling 94 from the recesses 128. The spindles 144 are also moved downward upon operation of the air cylinders 142, so that the spindles 144 are disengaged from the recesses 126. As a result, the float base 124 is horizontally movable. Under this condition, the lifter 156 is moved downward upon operation of the hydraulic cylinder 152, and the positioning pins 48 of the float base 124 are fitted in the positioning recesses 46, respectively. In this case, even if the position of the support plate 42 placed by the convey unit 400 is slightly deviated (e.g., about 5 mm), the float base 124 can be horizontally moved, and the positioning pins 48 can be properly inserted in the positioning recesses 46. The lifter 156 is further moved downward upon operation of the hydraulic cylinder 152, so that the support plate 42 is separated from the rollers 158. The abutment plates 136 are then moved upward upon operation of the air cylinders 132 of the centering means 130. The abutment plates 136 are elastically deformed and are moved upward while they are in slidable contact with the side surfaces of the float base 124. The float base 124 is horizontally moved while the support plate 42 is placed thereon causing the rotational center of the float base 124 to be substantially aligned with the rotational center of the rotating shaft 92. The spindles 144 are moved upward upon operation of the air cylinders 142. The upper portions of the spindles 144 are fitted in the recesses 126, respectively. When the compressed air is withdrawn from the air bearing pads 122, the float base 124 is moved downward and is placed on the upper surfaces of the air bearing pads 122. Since the spindles 144 are fitted in the corresponding recesses 126, the float base 124 and the support plate 42 are placed with high precision at predetermined positions with respect to the upper plate 104 and the rotating shaft 92.

The jig plate 44 having a hole in which part of the bolt 56 is screwed is conveyed by the convey unit 400 from the roller conveyer 12 to the setting table 100. The jig plate 44 is supported by the grip means 420 of the convey unit 400 on the support plate 42. The abutment plates 136 and the spindles 144 are moved downward upon the operation of air cylinders 132 and 142. At the same time, compressed air is supplied to the air bearing pads 122 so as to float the float base 124 and the support plate 42. The positioning pins 52 of the support plate 42 floating by means of the compressed air are fitted in the positioning recesses 50 of the jig plate 44 held by the grip means 420. In this case, the abutment plates 136 are moved downward and are separated from the side surface of the float base 124. When the spindles 144 are moved downward and are disengaged from the recesses 126, the float base 124 and the support plate 42 can be moved horizontally. For this reason, even if the holding position of the jig plate 44 by means of the grip means 420 is slightly deviated, the support plate 42 can also be slightly moved so that the positioning pins 52 are properly fitted in the positioning recesses 50. The jig plate 44 is then released from the grip means 420. The abutment plates 136 of the centering means 130 are moved upward abutting against the side surface of the float base 124 the rotational center of which is substantially aligned with that of the rotating shaft 92. The spindles 144 of the positioning means 140 are moved upward and are fitted in the corresponding recesses 126. When the supply of compressed air to the air bearing pads 122 is stopped, the float base 124, the support plate 42 and the jig plate 44 moved downward on the air bearing pads 122. The grip means 420 of the convey unit 400 grips a nut runner 600 (to be described later) and is conveyed to the top of the bolt 56 which is partially screwed into the support plate 44. The grip means 420 is then moved downward so as to engage an engaging portion of the nut runner 600 with that of the bolt 56. In this state, the grip means 420 holds and actuates the nut runner 600 to rotate the bolt 56, so that the bolt 56 is screwed in the support plate 42. Another blt 56 is also screwed in the support plate 42 in the same manner as described above, thereby fixing the support plate 42 and the jig plate 44.

The clamp 500 is set by the setting robot 200 in a predetermined setting hole 70 of the jig plate 44. The clamps 500 are located at a plurality of positions determined in accordance with the shape of the work 60. For example, if the operation range of the setting robot 200 cannot cover the positions of the clamp 500, the compressed air is supplied to the air bearing pads 122 to float the float base 124. At the same time, the rotating shaft 92 is moved upward to fit the projections of the coupling 94 in the corresponding recesses 128. The spindles 144 of the positioning means 140 are moved downward to disengage the spindles 144 from the recesses 126. The index unit 96 which receives a drive force of the motor 98 is rotated at a predetermined angle (e.g., 90 degrees). The spindles 144 of the positioning means are moved upward and engage with the recesses 126. The rotating shaft 92 is moved downward, and the supply of compressed air to the air bearing pads 122 is stopped. The float base 124 is placed on the air bearing pads 122 while the float base 124 is positioned by the positioning means 140. Another clamp 500 is set by the setting robot 200 on the jig plate 44. By repeating the above operation, all the clamps 500 are set on the jig plate 44. The rotating shaft 92 is moved downward, and the projections of couplings 94 are disengaged from the recesses 128. The work 60 is conveyed by the convey unit 400 from the roller table 12 to the jig plate 44. The work 60 is then held by the grip means 420 at a position immediately above the jig plate 44. Compressed air is supplied to the air bearing pads 122, making the float base 124 and the pallet 40 float. The pins 54 of the jig plate 44 are fitted in the recesses formed in the lower surface of the work 60. The jig plate 44 is caused to float so that the pins 54 can be properly fitted in the recesses even if the held position of the work 60 slightly deviates from the predetermined position. Therefore, the work 60 can be placed in the predetermined position of the jig plate 44. The gripping of the work 60 by the grip means 420 is released, and the abutment plates 136 of the centering means 130 are moved upward, thereby indexing the central position of the float base 124. The spindles 144 of the positioning means 140 are moved upward and are fitted in the positioning recesses 126. Supply of the compressed air to the air bearing pads 122 is stopped to move the float base 124 onto the air bearing pads 122. The clamp 500 is fastened by the nut runner 600 held by the grip means 420 of the convey unit 400 to fix the work 60 on the jig plate 44. In this case, the grip means 420 of the convey unit 400 can be moved back-and-forth and laterally to fix a plurality of clamps 500. Alternatively, when the abutment plates 136 and the spindles 144 are moved downward and the rotating shaft 92 is moved upward, compressed air is supplied to the air bearing pads 122, thereby floating the float base 124. In this state, the rotating shaft 92 is rotated to fasten the clamp 500 while the nut runner 600 is held in the predetermined position. In this manner, the work 60 is fixed on the pallet 40, and the set-up operation is completed. Thereafter, the hydraulic cylinder 152 is actuated to move the lifter 156 upward, thereby lifting the pallet 40 and the work 60. The pallet 40 and the work 60 are transferred by the convey unit 400 or by another means of delivery (not shown) from the setting table 100 to the roller table 14. The pallet 40 and the work 60 are conveyed forward along the roller table 14.

When the clamp 500 is prefixed on the jig plate 44 (i.e., when the jig plate for a specific work having a predetermined shape and size is used), the clamp 500 doesn't need to be set on the jig plate 44. The clearance between the air bearing pads 122 and the float base 124 can be measured by measuring an air pressure of the air bearing pads 122. Air pressure can also be utilized to detect whether or not the float base 124 is brought into contact with the air bearing pads 122. The broken lines in FIG. 3 indicate a hydraulic cylinder and an automatic coupler which are used to hydraulically clamp the work which will be described in detail later on.

The positioning pins are fitted in the positioning recesses in order to determine the relative locations of the support table, the jig table and the work. However, the setting position by the convey unit may have a slight deviation. In each set-up cycle, a plurality of times of fitting operations must be performed. For this reason, errors in the setting position are accumulated. If this happens, the positioning pins cannot be fitted in the positioning recesses. In this embodiment, in order to solve the above problem, centering means 130 and positioning means 140 are provided to smoothly perform the set-up operation. As a result, the support plate 42 or the like can be set in a predetermined position for each fitting operation so that no error in the setting position will accumulate.

Figure 4:
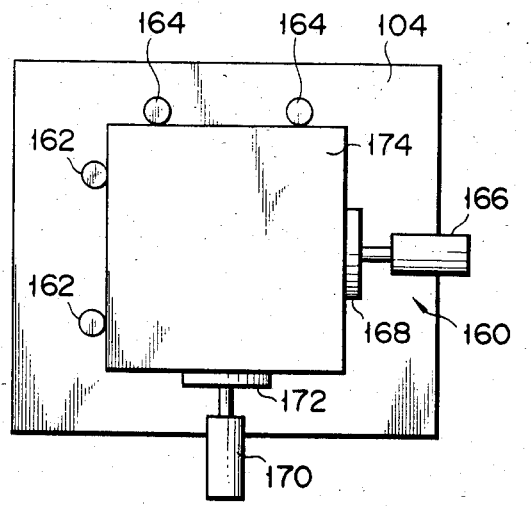
FIG. 4 is a plan view showing a modification of the setting table.
Figure 5:
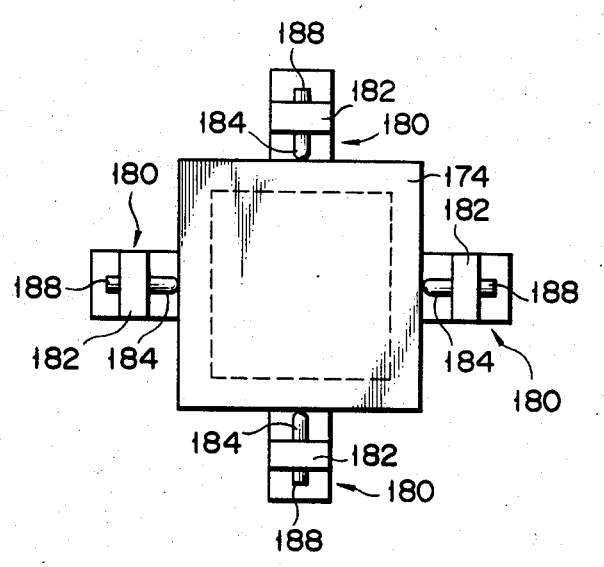
FIG. 5 is a plan view showing another modification of the setting table.
Figure 6:
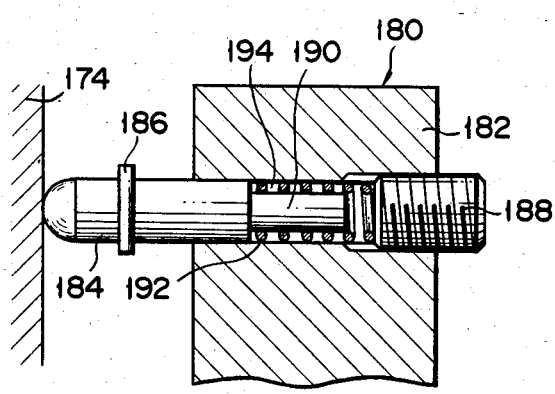
FIG. 6 is a partial longitudinal sectional view of a centering means 180 shown in FIG. 5.

The positioning means 160 shown in FIGS. 4, 5 and 6 can be provided in place of the centering means 130 and the positioning means 140. FIG. 4 shows the positioning means 160 as a first modification. In this figure, 2 pairs of positioning pins 162, 164 and 2 press cylinders 166, 170 are disposed around a square float base 174. The 2 positioning pins 162 are opposite of the press cylinder 166; the positioning pins 164 are opposite of the press cylinder 170 which is adjacent to press cylinder 166. The press cylinder 166 is arranged so that a press plate 168 at the distal end of a piston rod can urge the side surface of the float base 174 against the positioning pins 162. Similarly, the press cylinder 170 is arranged such that a press plate 172 at the distal end of a piston rod thereof can urge the side surface of the float base 174 against the positioning pins 164. The float base 174 floating by the compressed air supplied to the air bearing pads 122 is properly positioned when it abuts against the positioning pins 162 and 164.

FIGS. 5 and 6 show a second modification of the positioning means. Four press members 180 are arranged so that each one is disposed to each of the four side surfaces of a float base 174. Each press member 180, as shown in the enlargement of FIG. 6, comprises a support body 182, and a press pin 184 whose rear portion is supported in a support hole 194 formed in the support body 182. The press pin 184 can move towards the corresponding side surface of the float base 174. An extended pin 190 having a diameter smaller than that of the press pin 184 is fixed to be coaxial with the press pin 184. A thread is formed on the rear portion of the support hole 194. A bolt 188 is screwed in the thread. A compression spring 192 is mounted around the extended pin 190 between the press pin 184 and the bolt 188. The press pins 184 which are biased by the springs 192 abut against the side surfaces of the float base 174. For this reason, if the float base 174 moves horizontally when the positioning pins 48 are fitted in the positioning recesses 46, the float base 174 is balanced by means of the four springs 192 when the external force no longer acts on the float base 174. Therefore, after positioning, the float base 174 is always balanced. This balanced position can be arbitrarily set by respectively adjusting the bolts 188 and hence changing the biasing forces of the springs 192.

In the setting table of the present invention, the pallet and the work can be automatically set up. The air bearing pads are fixed on the frame, so that air can be easily supplied. In addition, no movable members are used, so mechanical trouble can be minimized.

Furthermore, because air is blown upward from the air bearing pads, the float base remains clean, thereby preventing mechanical trouble due to cutting chips and foreign materials. The air film thickness between the float base and the air bearing pads does not vary even if a local overload is applied to the float base. Therefore the float base can float uniformly, and horizontal frictional resistance can be minimized. Furthermore, since the float base floats in air, the friction resistance is small enough that the index unit can be rotated with a minimum of drive and can be made compact. Centering of the float base in the floating state can be performed by the centering means having elastic abutment plates. As a result, the positioning pins can be easily fitted in the positioning recesses. In addition to the above advantages, since the support plate is moved upward by the two pairs of lifters, the support plate can be fully automatically conveyed.

If a setting table don't have a float base, the positional deviation of the support plate, the jig plate and the work cannot be absorbed by the setting table. In this case, an index unit is disposed between the roller conveyer 12 and the setting table. The support plate, the jig plate and the work which are conveyed by the roller conveyer 12 are transferred to the index unit and are indexed. These components are then transferred by a convey robot or the like onto the setting table.

Figure 7:
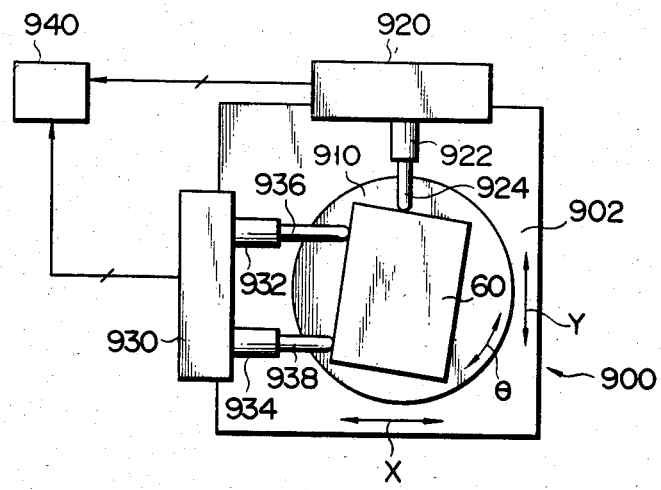
FIG. 7 is a plan view of an indexing unit.
Figure 8:
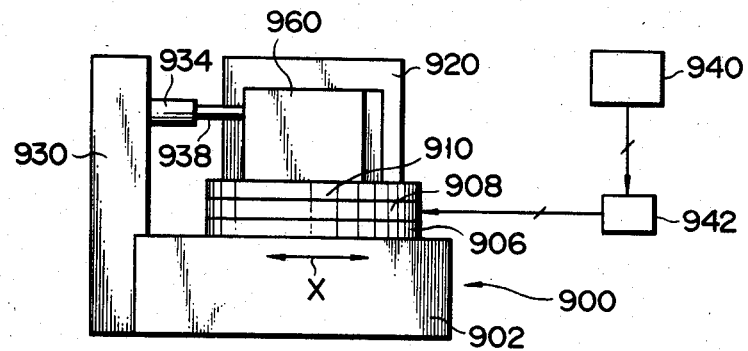
FIG. 8 is a side view of the indexing unit.

FIGS. 7 and 8 show an index unit 900. A disk-like X table 906, a Y table 908, and θ table 910 overlap each other on a base 902. The X table 906 can linearly reciprocate along the X direction with respect to the base 902. The Y table 908 linearly reciprocates along the Y direction with respect to the X table 906. The table 910 can rotate such that the center of the table 910 is aligned with the center of the table 908. The θ movement of the X and Y tables 906 and 908 and the rotation of the θ table 910 are driven by a stepping motor (not shown). A first position detector 922 is arranged on a support 920 so that a detecting element 924 is directed toward the Y direction. Second and third position detectors 932 and 934 are supported by a support 930 such that detecting elements 936 and 938 are directed toward the X direction and are spaced apart from each other along the Y direction. The first to third position detectors 922, 932 and 934 comprise differential transformer detectors. The detecting element 924 or 936 and the detecting element 938 can move along the Y or X direction until they abut against the objects of the work 60 placed on the θ table and detect its position. Detection currents from the position detectors 922, 932 and 934 are supplied to an operation unit 940 which then calculates the position of the object and a deviation from the predetermined position. When the actual position of the object is deviated from the predetermined position, a signal is supplied from the operation unit 940 to a driver 942. The driver 942 drives the stepping motor to move or rotate the tables 906, 908 and 910.

Figure 9:
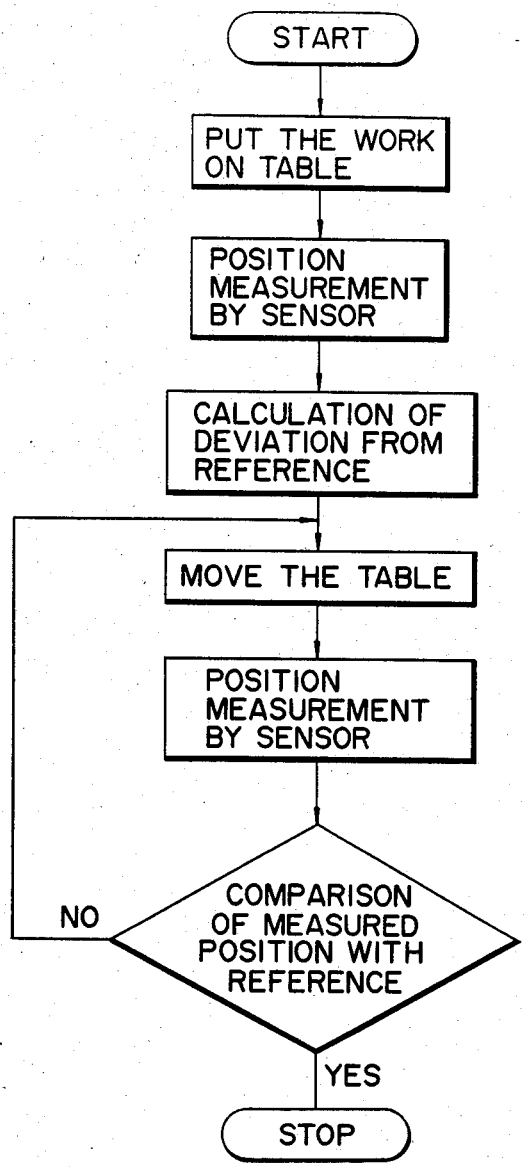
FIG. 9 is a flow chart for explaining the operation of the indexing unit.

The operation of the index unit 900 will be described with reference to the flow chart shown in FIG. 9. An object (e.g., work) is conveyed by the convey unit and is placed on the θ table 910. The first to third position detectors 922, 932 and 934 detect the position of the work 60. Detection currents are supplied from the detectors 922, 932 and 934 to the operation unit 940. The operation unit 940 calculates the position of the work 60 and a positional deviation from the predetermined reference position. The operation unit 940 causes the driver 942 to drive the tables 906, 908 and 910 by amounts corresponding to the deviation. The first, second and third position detectors 922, 932 and 934 detect the position of the work 60 again. The operation unit 940 calculates the detected position of the work 60 and its positional deviation. The operation unit 940 detects whether or not the deviation falls within an allowable range. If the answer is YES in the above step, indexing is ended. However, if the answer is NO in this step, the operation unit 940 generates signals to the driver 942 to move/rotate tables 906, 908 and 910 to compensate for the deviation. When this operation is repeated, and the deviation between the detected position and the predetermined position falls within the allowable range, indexing is ended.

In this manner, the work is indexed by the index unit in advance. Indexing need not be performed by the setting table 100, thereby increasing the set-up speed. According to the index unit of the present invention, even if the shape, size and weight of the work change, all the reference data is stored in the operation unit 940 to cover all possible cases. In addition, the work itself is not moved, but the tables are moved, thereby decreasing the errors in displacement accuracy caused by the difference in the friction coefficients between objects having different weights. Furthermore, if the work has a three-dimensional side surface or an arcuated profile, and is subjected to indexing such that the work is urged against the index jig, indexing precision is degraded. However, the tables are moved instead of the work itself, thereby preventing the degradation of the indexing precision. Therefore, the index unit of this embodiment is suitable for the FMS with a maximum degree of flexibility.

In the above embodiment, the position detector comprises the differential transformer detector. However, a potentiometer can be used as the position detector. Alternatively, a photosensor such as an ITV camera or CCD (charge coupled device) can be used to detect the positional deviation. In the above embodiment, the first to third position detectors are used. However, three or more detectors can be used to improve indexing precision. The position measurement and its correction can be performed as follows. The second and third position detectors 932 and 934 are used to correct the positional deviation of the work 60 along the θ direction. Thereafter, the first to third detectors 922, 932 and 934 are used to correct deviations along the X and Y directions.

Figure 10:
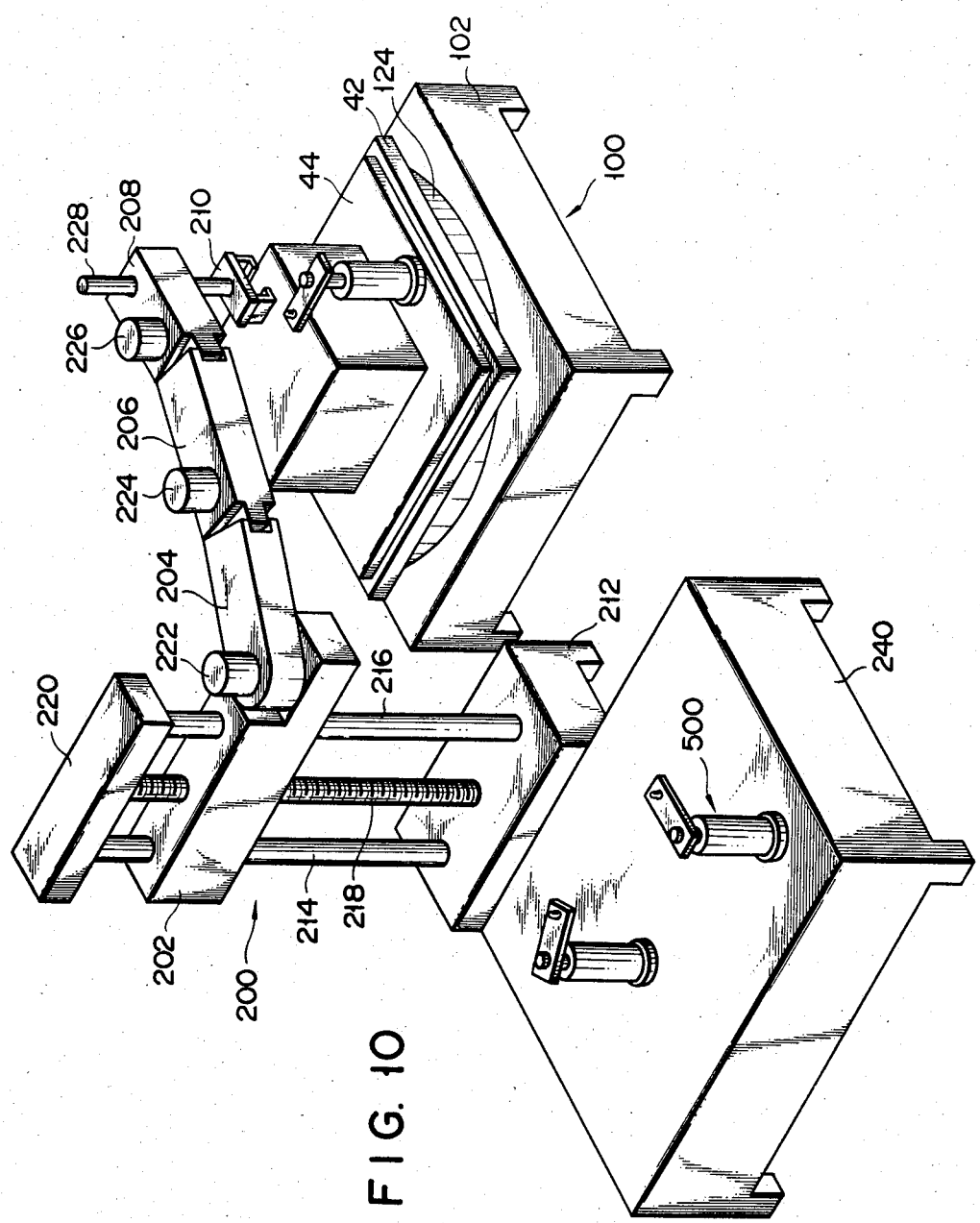
FIG. 10 is a perspective view of a setting robot 200.
Figure 11:
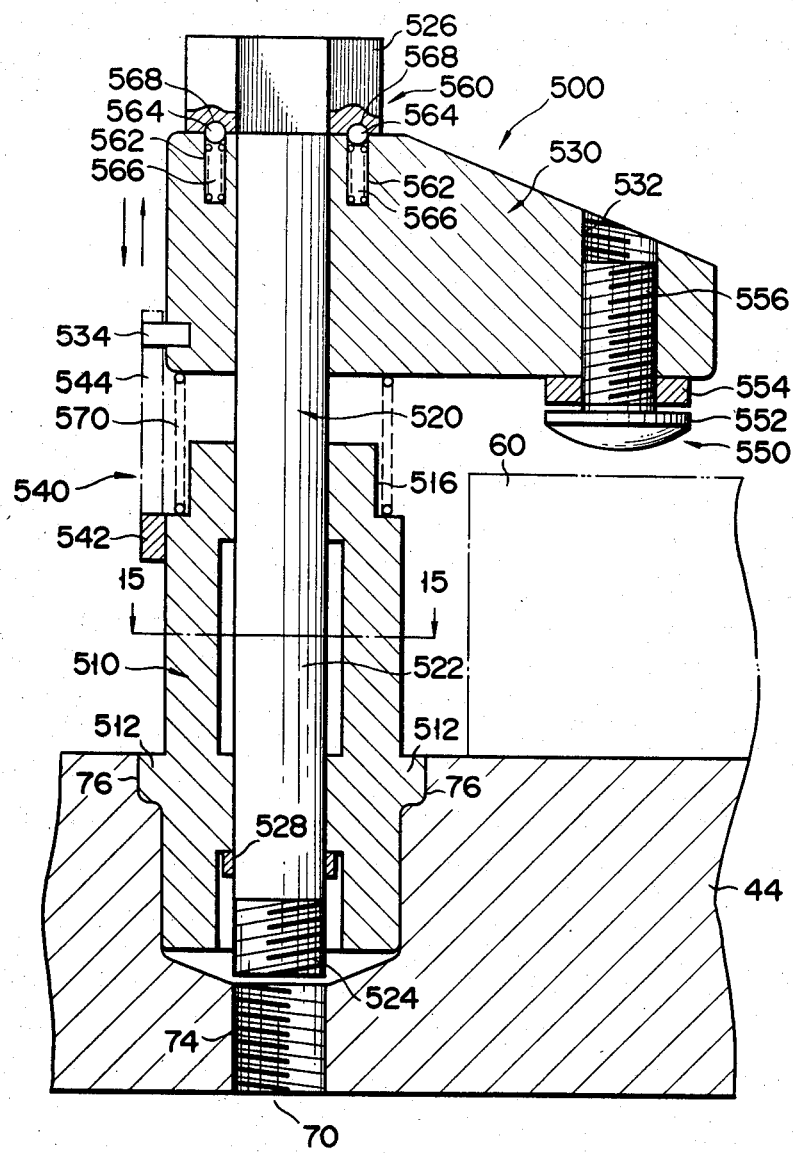
FIG. 11 is a longitudinal sectional view of a mechanical clamp 500.

The setting robot 200 will be described with reference to FIG. 10. The setting robot 200 has a lift arm 202, turning arms 204, 206, and 208, and a gripper 210. Two support rods 214 and 216 extend upward from a base 212. A threaded rod 218 rotatably extends upward from the base 212 to be disposed between and parallel to the support rods 214 and 216. The support rods 214 and 216 extend through the lift arm 202. The lift arm 202 is screwed with the threaded rod 218. The upper ends of the support rods 214 and 216 are connected to a connecting member 220. The upper end of the threaded rod 218 is rotatably supported by the connecting member 220. The threaded rod 218 can be driven by a motor arranged in the base 212 in the forward/reverse direction. Upon rotation of the threaded rod 218, the lift arm 202 moves vertically. The lift arm 202 rotatably supports the turning arm 204 which, in turn, rotatably supports the turning arm 206. The turning arm 206 rotatably supports the turning arm 208. The turning arms 204, 206 and 208 are driven by motors 222, 224 and 226, respectively. A support rod 228 is mounted on the frontmost turning arm 208 to be vertically movable with respect to the turning arm 208. The gripper 210 is mounted on the lower end of the support rod 228. The gripping/releasing of the gripper 210 is performed by a motor (not shown).

A jig table 240 is disposed in the vicinity of the setting robot 200 so as to oppose the setting table 100. Clamps 500 are placed on the jig table 240. The turning arms 204, 206 and 208 are turned to cause the gripper 210 to be located above the clamps 500 on the jig table 240. The lift arm 202 is moved downward to cause the gripper 210 to grip the clamp 500. The lift arm 202 is then moved upward, and the turning arms 204, 206 and 208 are turned to locate the gripper 210 at a predetermined position of the jig plate 44. Thereafter, the lift arm 202 is moved downward to cause the gripper 210 to release the clamp 500 which is then set on the jig plate 44.

Figure 12:
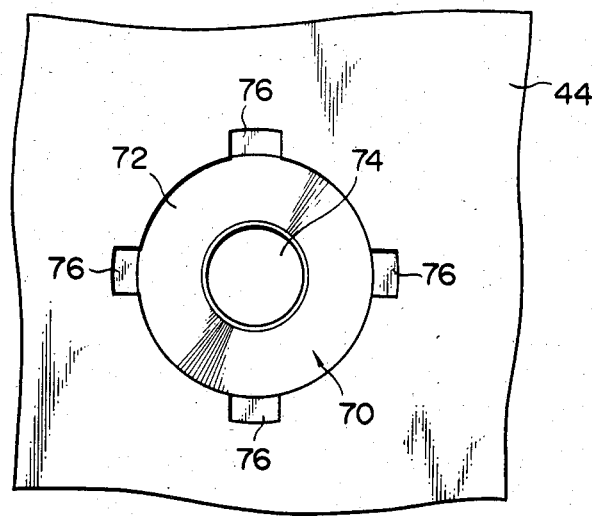
FIG. 12 is a plan view of a setting hole 70.
Figure 13:
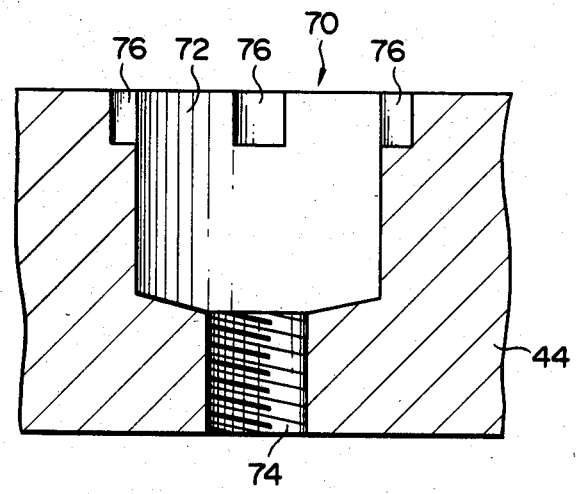
FIG. 13 is a longitudinal section view of the setting hole 70.
Figure 14:
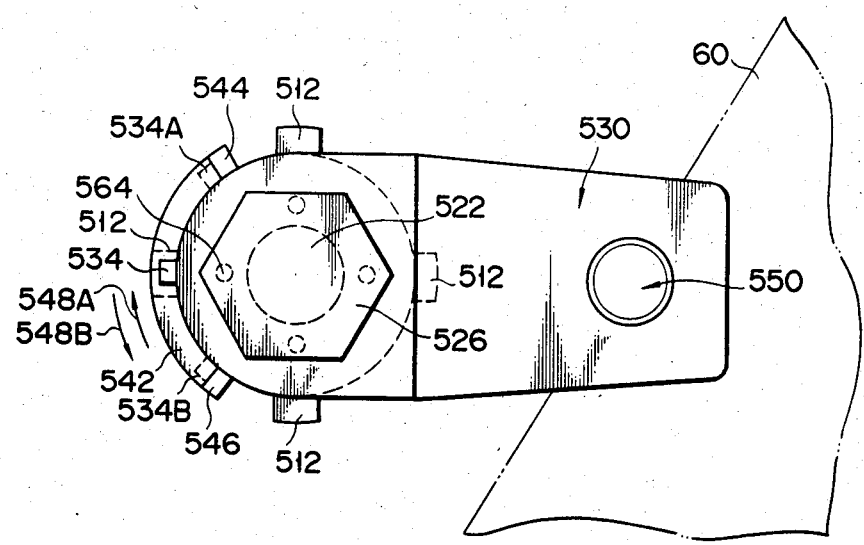
FIG. 14 is a plan view for explaining the operation of the mechanical clamp 500.
Figure 15:
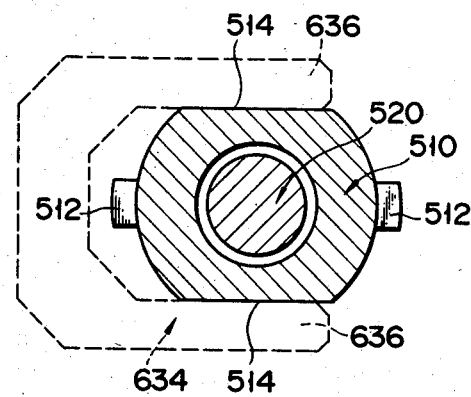
FIG. 15 is a cross-sectional view of a flat portion 514.

The construction of the clamp 500 will now be described with reference to FIGS. 11 to 15. As shown in FIGS. 12 and 13, setting holes 70 are formed in the jig plate 44 in a checkerboard manner. The setting hole 70 is constituted by an engaging hole 72 formed in the upper surface of the jig plate 44 and a right-hand female thread hole 74 formed in the lower surface of the jig plate 44. Four recesses 76 are formed at equal angular intervals in the upper end portion of the jig plate 44 which defines the hole 70. The clamp 500 has a stationary shaft 510, a rotating shaft 520 and a clamp arm 530. The stationary shaft 510 has a cylindrical shape and has an outer diameter equal to that of the diameter of the engaging hole 72. The lower half of the stationary shaft 510 is fitted in the engaging hole 72. A projection 512 is formed on the stationary shaft 510 to be fitted in the recess 76. When the projection 512 is engaged with the recess 76, the stationary shaft 510 is fitted in the engaging hole 70 without being subjected to rotation. As shown in FIG. 15 which is the sectional view taken along the line 15—15 of FIG. 11, the stationary shaft 510 has flat portions 514 centrally located along its longitudinal direction. The stationary shaft 510 has a small diameter step 516 which has a diameter smaller than that of the engaging hole 72. A rotational angle regulating member 540 of the rotating shaft 520 is formed on the outer surface immediately below the step 516 of the stationary shaft 510. The member 540 has a circumferential portion 542 being curved along the outer surface of the stationary shaft 510, and standing portions 544 and 546 formed at two ends of the circumferential portion 542, which extend in the longitudinal direction of the stationary shaft 510. The standing portions 544 and 546 are formed at a predetermined angular intervals (e.g., 120 degrees) with respect to the center of the stationary shaft 510.

The rotating shaft 520 is inserted in the stationary shaft 510 to be coaxial and rotatable. The rotating shaft 520 has a columnar or cylindrical shaft portion 522 having: a lower end to which an annular stopper 528 is fixed; a right-hand thread portion 524 formed at the lower end of the shaft portion 522; and a hexagonal head 526 fixed at the upper end of the shaft portion 522.

A clamp arm 530 is fitted into the shaft portion 522 between the head 526 and the stationary shaft 510. The proximal portion of the clamp arm 530 is fitted in the rotating shaft 520. A vertical female thread is formed at the distal end portion of the clamp arm 530. A clamp member 550 is supported at the distal end of the clamp arm 530. The clamp member 550 has a bolt portion 556 engaged in a female thread hole 532 and an abutment portion 552 fixed at the lower end of the bolt portion 556. The abutment portion 552 rotates the bolt portion 556 to adjust the vertical position of the abutment portion 552. A nut 554 is screwed in the portion of the bolt portion 556 which extends from the female thread hole 532, so that the nut 554 is urged against the lower surface of the clamp arm 530 to fix the clamp member 550 at the clamp arm 530. A projection 534 is fixed on the surface of the side wall of the clamp arm 530 which is located in an opposite side to the clamp member 550. As shown in FIG. 14, the projection 534 is movable between the standing portions 544 and 546 upon the pivotal movement of the clamp arm 530. The pivotal range of the clamp arm 530 is defined by the projection 534 between the position 534A where the projection 534 abuts agninst the standing portion 544 and the position 534B where the projection 534 abuts against the standing portion 546. When the projection 534 is located at the position 534A, the clamp member 550 is located immediately above the work 60 to be placed on the jig plate 44. The longitudinal direction of the clamp arm 530 is perpendicular to the surface of the side wall of the work 60. However, when the projection 534 is located at the position 534B, the clamp member 550 is located outside the range immediately above the work 60 to be placed on the jig plate 44. In order to determine the positions of the clamp member 550 as described above, the setting position of the stationary shaft 510 in the setting hole 70 and the mounting position of the regulating member 540 are determined.

A turning mechanism 560 is mounted on the upper end of the proximal portion of the clamp arm 530 to turn the clamp arm 530. The turning mechanism 560 has: four cylindrical recesses 562 which are opened to the upper surface of the proximal portion of the clamp arm 530, which are formed peripherally around the rotating shaft 520, and which have the same longitudinal direction as that of the rotating shaft 520; balls 564 which are movable in the recesses 562; compression springs 566 which are disposed in the recesses 562 to bias the balls 562 in an upward motion; and four semi-spherical recesses 568 which are formed in the lower surface of the head 526, each of which has a shape corresponding to half of the ball 564. Two of the recesses 562 and two of the recesses 568 lie opposite to each other. The remaining pairs of recesses 562 and 568 also lie opposite to each other and are adjacent to the other pairs. Therefore, when the recesses 562 are aligned with the recesses 568, and when the balls 564 are fitted in the recesses 568, the head 526 is rotated together with the clamp arm 530.

A compression spring 570 is arranged between the step 56 of the stationary shaft 510 and the lower surface of the clamp arm 530. The compression spring 570 biases the clamp arm 530 upward.

Figure 16:
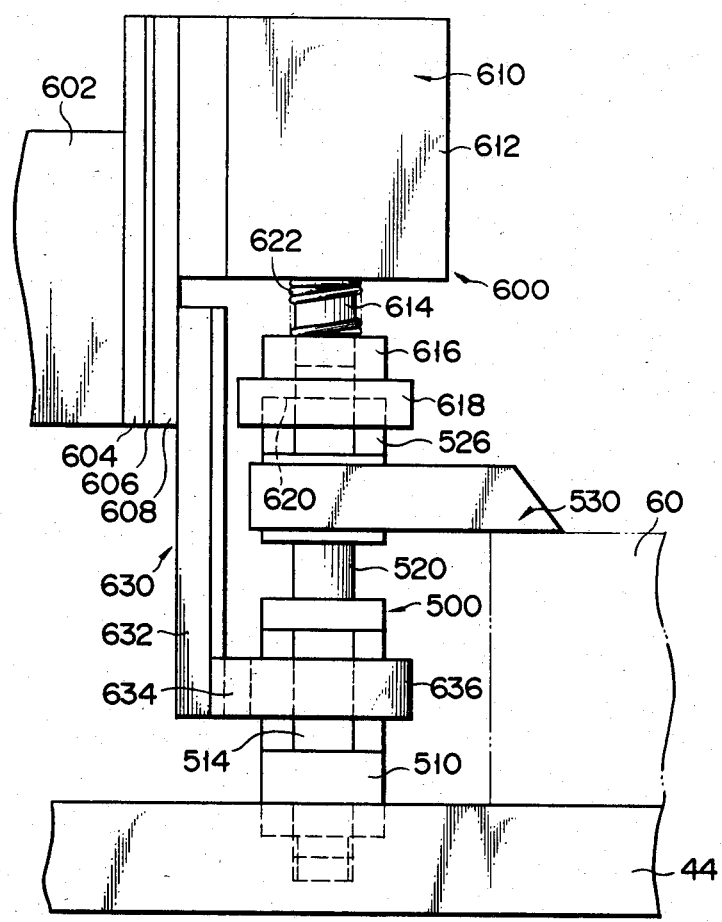
FIG. 16 is a side view showing the operation of the mechanical clamp 500 and a nut runner 600.

The construction of the nut runner 600 for driving the clamp 500 will be described with reference to FIG. 16. The nut runner 600 has a drive section 610 and a stop section 630. A base body 602 is held by the grip means 420 of the convey unit 400. A base plate 604 is fixed on the surface of the front side wall of the base body 602. An elastic plate 606 made of rubber or the like is fixed on the base plate 604. The base plate 608 is fixed on the elastic plate 606. The drive section 610 is mounted in the upper portion of the base plate 608, and the stop section 630 is mounted in the lower portion thereof. The drive section 610 has a main housing 612 for storing a reversible motor, which is fixed on the base plate 608, and a driving shaft 614 extending downward from the lower end of the main housing 612. The driving shaft 614 is rotated by the motor. A lift member 616 is fitted on the driving shaft 614. A groove (not shown) is formed on the outer surface of the driving shaft 614 to extend along the longitudinal direction of the driving shaft 614. A projection (not shown) is formed in the inner surface of the lift member 616 and is fitted in the groove of the driving shaft 614, so hat the lift member 616 can be vertically moved a desired distance along the driving shaft 614. However, the lift member 616 will not rotate around the driving shaft 614 by means of an engagement of the projection and recess. The lift member 616 is biased downward by a compression spring 622 mounted around the driving shaft 614. A fitting member 618 is fixed at the lower end of the lift member 616. The fitting member 618 has a hexagonal recess 620 opened at the lower surface thereof. The head 526 of the rotating shaft 520 of the clamp 500 is fitted in the recess 620.

The stop section 630 has a support plate 632 fixed to the base plate 608 and a holding member 634 fixed at the lower end of the support plate 632. The holding member 634 has a pair of arms 636, as indicated by the dotted line in FIG. 15. The distance between the arms 636 is the same as that between the flat portions 514 of the stationary shaft 510 of the clamp 500. When the fitting member 618 is fitted with the head 526, the holding member 634 holds the flat portions 514 of the stationary shaft 510.

The operation of the clamp 500 and the nut runner 600 described above will be described next. The clamps 500 are set by the setting robot 200 in a plurality of positions on the jig plate 44. The positions are determined by the shape and size of the work to be set up. When the projection 534 is located at the position 534B, the clamp member 550 is located outside the range immediately above the work 60. However, when the projection 534 is located at the position 534A, the clamp member 550 is located immediately above the work 60. The stationary shaft 510 is fitted in the engaging hole 70 such that the clamp member 550 of the clamp arm 530 is located outside the range immediately above the work 60 when the projection 534 is located at the position 534B. The base body 602 of the nut runner is gripped by the grip means 420 of the convey unit 400, so that the nut runner is located by the convey unit 400 next to the clamp 500. Thereafter, the convey unit 400 moves the nut runner 600 forward to cause the arm 636 of the holding member 634 to engage with the flat portions 514 of the stationary shaft 510 and to move the driving shaft 614 of the drive section 610 to the position immediately above the rotating shaft 520. The grip means 420 of the convey unit 400 is moved downward, and the drive section 610 is moved downward. When the motor in the housing 612 of the drive section 610 is started, the driving shaft 614 rotates clockwise. When the driving shaft 614 is moved downward, the fitting member 618 is fitted with the head 526 of the rotating shaft 520, so that the rotating shaft 520 is also rotated clockwise. The impact between the fitting member 618 and the head 526 is absorbed by the spring 622. The head 526 is rotated while the head 526 slides on the upper surface of the clamp arm 530. When the recesses 568 match with the recesses 562, the balls 564 biased by the springs 566 are engaged with the recesses 568, so that the clamp arm 530 rotates together with the rotating shaft 520 clockwise.

As shown in FIG. 14, the projection 534 is rotated from the position 534B to the position 534A along a direction indicated by an arrow 548A. When the projection 534 abuts against the standing portion 544, the clamp arm 530 is stopped. Thereafter, the balls 564 are urged inside the recesses 562 against the biasing forces of the springs 566, so that only the rotating shaft 520 continues to rotate clockwise. When the housing 612 is moved downward, the rotating shaft 520 is moved downward while it rotates. The thread portion 524 is screwed in the hole 74. In this case, the impact between the male thread portion 524 and the female thread hole 74 is absorbed by the spring 622. The rotating shaft 520 further continues to rotate, so that the male thread portion 524 is engaged in the female thread hole 74. The clamp arm 530 is stopped by the head 526 and is moved downward against the biasing force of the spring 570. The abutment portion 552 of the clamp member 550 is moved downward and abuts against the upper surface of the work 60. When the abutment portion 552 urges the upper surface of the work 60 by a predetermined force, and the rotational resistance of the motor in the housing 612 with respect to the rotating shaft 520 reaches a predetermined value, the motor is stopped and the convey unit 400 will no longer be moved downward. The convey unit 400 is moved upward until the fitting member 618 is separated from the head 526. Thereafter, the convey unit 400 is horizontally moved until the holding member 634 is separated from the stationary shaft 510. The float base 124 floats to rotate the pallet 40. The convey unit 400 conveys another clamp 500 in the vicinity of the nut runner 600, and the work 60 is fixed on the jig plate 44 through the clamps 500. The pallet 40 is not rotated, and the grip means 420 of the convey unit 400 is driven back-and-forth and laterally, so that the nut runner 600 can be moved to a position next to another clamp 500.

In order to disassemble the clamp 500, the fitting member 618 is fitted with the head 526 in the same manner as described above. While the driving shaft 614 is rotated counterclockwise, it is moved upward. In this manner, the abutment portion 552 is separated from the upper surface of the work 60. When the clamp arm 530 turns counterclockwise, the projection 534 is moved from the position 534A to the position 534B along the direction 548B. The clamp arm 530 is located outside the range immediately above the work 60. When the rotating shaft 520 is further rotated counterclockwise, the male thread portion 524 is separated from the female thread hole 74. The clamp arm 530 is biased upward by the spring 570, and the stopper 528 is engaged with the stationary shaft 510, so that the work 60 is released from the jig plate 44. The clamp 500 can be pulled by the setting robot 200 from the setting hole 70.

Another embodiment of the clamp 500 will be described with reference to FIG. 17. In this embodiment, a stationary shaft 572 is concentrically inserted in a rotating shaft 576. An engaging portion 574 having a hexagonal section is formed at the lower end of the stationary shaft 572. A setting hole 70 formed in the jig plate 44 is constituted by a right-hand female thread hole 78 and a hexagonal engaging hole 80 which is formed under the female thread hole 78. The stationary shaft 572 is fixed such that the engaging portion 574 is fitted in the engaging hole 80. The rotating shaft 576 comprises: a right-hand male thread portion 578 at the lower end portion thereof; a hexagonal head 582 at an upper end portion thereof to be fitted with a fitting member 618 of a nut runner 600; and an annular stopper 580 at an intermediate portion thereof. A clamp arm 530 is fitted to the rotating shaft 576 between the head 582 and the stopper 580. The clamp arm 530 is rotated by 120 degrees by means of a regulating member 540 and a projection 534 in the same manner as in the embodiment shown in FIG. 11. A turning mechanism 560 is disposed between the clamp arm 530 and the lower surface of the collar of the head 582. The male thread portion 578 of the rotating shaft 576 is screwed in the female thread hole 78 of the setting hole 70. An annular stopper 584 is fixed in the vicinity of the engaging portion 574 of the stationary shaft 572. A compression spring 586 is inserted between the stopper 584 and the rotating shaft 576 to bias the rotating shaft 576 upward.

In this embodiment, the driving shaft 614 is moved downward while the head 582 of the rotating shaft 576 is rotated clockwise by the nut runner 600. The clamp arm 530 is turned 180 degrees so as to screw the male thread portion 578 of the rotating shaft 576 into the female thread hole 78. The rotating shaft 576 is thus moved downward, and the work 60 is clamped and fixed between the clamp member 550 and the jig plate 44. On the other hand, when the head 582 is turned counterclockwise, the rotating shaft 576 is moved upward, so that the male thread portion 578 is disengaged from the female thread hole 78.

FIG. 18 shows still another embodiment of the clamp 500. The clamp of this embodiment is substantially the same as that shown in FIG. 11, except for the portion in the vicinity of the setting hole 70. In this embodiment, the setting hole 70 has the engaging hole 72, but does not have the female thread hole 74. A columnar hole 590 having an annular recess is formed in a portion of the support plate 42 which matches with the engaging hole 70. A columnar nut 592 having a collar is housed in the hole 590 in such a way that a left-hand female thread hole 594 formed at the center thereof matches the dimensions of a rotating shaft 520. The nut 592 is engaged with the hole 590 to be rotatable. A hexagonal recess 596 is formed at the center of the lower surface of the nut 592. A left-hand male thread portion 588 in place of the right-hand male thread portion 524 is formed at the lower end of the rotating shaft 520.

The nut 592 is turned counterclockwise while a hexagonal projection of the nut runner is fitted in the recess 596, so that the clamp arm 530 is turned clockwise to locate the clamp member 550 immediately above the work 60. As a result, the male thread portion 588 can be engaged with the female thread hole 594, and the rotating shaft 520 is moved downward. The work 60 can be fastened by the clamp member 550. When the nut 592 is turned clockwise, the rotating shaft 520 is separated from the nut 592. In this embodiment, the nut runner is used from the bottom surface of the support plate 42.

The turning mechanism 560 is not limited to the mechanism shown in the above embodiment. For example, a helical swing groove can be formed in a regulating member 540 along the longitudinal direction of the rotating shaft 520, and a porjection 534 can be formed to engage with the swing groove. A clamp arm 530 may swing by using the projection 534 as a guide pin upon the vertical movement of the rotating shaft 520. Alternatively, a swing groove may be formed in the rear surface of a clamp arm 530, and a guide pin may be mounted on a stationary shaft 510 to engage with the swing groove. In addition to these modifications, a hollow shaft is concentrically inserted between the rotating shaft 520 and the stationary shaft 510. A clamp arm 530 is fixed at the upper end of the hollow shaft, and the swing groove is formed at the intermediate portion of the hollow shaft. A guide pin is formed on the stationary shaft 510 to engage with the swing groove. The clamp arm 530 can swing upon vertical movement of the rotating shaft 520.

The clamp 500 having the construction described above can properly set/reset the work 60 at a high speed. Furthermore, the clamps can be set/reset in any position so as to handle works having different shapes and sizes.

In the nut runner 600 having the construction described above, a rotational torque generated by the drive section 610 is only slightly transmitted to the base body 602 by means of an elastic plate 606 which acts on the holding member 634 engaged with the stationary shaft 510. Therefore, even if the base body 602 has a low rigidity, the fastening/loosening of the screw can be properly performed, and the base body 602 can be moved to any position.

The arms 636 of the holdng member 634 can be opened/closed by an opening/closing mechanism so as to hold any size of work. For example, elastic members made of a material such as rubber can be formed on the inner surfaces of the arms 636. The holding member 634 can be vertically movable along the support plate 632. Furthermore, the drive section 610 and the stop section 630 are held such that the grip means 420 of the convey unit 400 holds the base body 602. In another modification, the drive section 610 and the stop section 630 may be held by the setting robot 200.

By constructing the nut runner 600 in a manner shown in FIG. 19, the screws can be easily fastened/loosened even if the fastening/loosening direction of the screws vary. Grip members 424 in place of the grip members 422 (FIG. 1) are mounted on the lower end of a lift member 410 of a convey unit 400. The grip members 424 comprise plates to oppose each other and are detachably mounted at the lower end of the lift member 410. A plurality of projections 426 is formed on the opposing surface portions of the grip members 424.

The nut runner 600 of this embodiment has a horizontal turning means 640 and a vertical turning means 650. The horizontal turning means 640 has a rectangular prism shaped holder 642. A plurality of recesses 64 is formed on a pair of outer surfaces of the holder 642. The projections 426 of the grip members 424 are fitted in the recesses 644, so that the grip members 424 support the holder 642. A horizontal turning motor 646 is mounted in the holder 642. The vertical turning means 650 is mounted at the lower surface of a drive shaft 648 of the motor 646. The vertical turning means 650 has a holder 652 fixed at the lower end of the drive shaft 648. A vertical turning motor 654 is mounted in the holder 652. The drive shaft of the motor 654 extends horizontally. A hollow cylindrical pipe 656 is fixed at the distal end of the drive shaft such that the pipe 656 extends to be perpendicular to the drive shaft of the motor 654. A motor 658 is mounted at the end portion of the pipe 656 which is opposite the motor 654. The motor 658 is mounted in the pipe 656 such that the drive shaft 660 of the motor 658 is aligned with the pipe 656. A spring 662 and a fitting member 664 (lift member is not illustrated) which have the same construction as the spring 622, the lift member 616 and the fitting member 618 of the embodiment shown in FIG. 16 are provided at the distal end of the drive shaft 660. Electrical wires for the motors 646, 654 and 658 are connected to those guided in the lift member 410 through a coupler 666. If the electrical wires are disconnected at the coupler 666, the holder 642 can be removed from the grip members 424, so that the nut runner 600 can be removed from the convey unit 400.

Next, the operation of the nut runner 600 having the construction described above will be described. When the motor 646 of the horizontal turning means 640 is driven, the holder 652 of the vertical turning means 650 is rotated about the vertical axis. When the motor 654 of the vertical turning means 650 is driven, the pipe 656 is rotated about the horizontal axis. The fitting member 664 can be fitted inside the screw head (e.g., head 526), no matter what direction the screw is placed (vertically, horizontally or obliquely), as shown in FIG. 19. When the motor 658 is rotated, the screw can be fastened or loosened.

According to the nut runner having the construction described above, the drive shaft 660 of the motor 658 for driving the screw by means of the horizontal and vertical turning means 640 and 650 can be easily set to be concentric with the screw. Therefore, screw tightening or loosening can be effectively and accurately performed even if the axial directions of the screws vary in a wide range. Therefore, by using this nut runner, the set-up operation of the pallet 40 and the work 60 can be performed while the pallet 40 is vertically positioned.

The hydraulic clamp 700 will be described in detail with reference to FIGS. 20 to 24. When the nut runner 600 rotates the rotating shaft, the clamp 500 mechanically clamps the work 60 on the pallet 40. The hydraulic clamp 700 can be used in place of the clamp 500. However, the hydraulic clamp 700 serves to clamp the work 60 on the pallet 40 in accordance with hydraulic power. The hydraulic clamp 700 has a clamp means 708 and a compressing means 750.

The clamp means 708 has a lift shaft 720, and a support 710 for supporting the lift shaft 720 which is vertically movable along the support 710. The support 710 has a cylindrical side plate 712, and upper and lower plates 714 and 716 which are fixed at the upper and lower ends of the side plate 712. the columnar lift shaft 720 coaxially extends through the upper, lower and side plates 714, 716 and 712. A clamp arm 742 is fixed at the upper end of the lift shaft 720. A prism-shaped stopper rod 726 is fixed at the lower end of the lift shaft 720 such that their longitudinal axes are perpendicular to each other. A disk-shaped stopper plate 724 is fixed at a portion of the lift shaft 720 which is lower than the lower plate 716, and the center of the stopper plate 724 is substantially aligned with that of the lift shaft 720. A compression spring 740 is inserted between the upper plate 714 of the support 710 and the clamp arm 742. A pair of support columns 736 is screwed onto the upper surface of the lower plate 716 inside the side plate 712. The support columns 736 are parallel to the lift shaft 720. A guide pin 738 is fixed on the support column 736 to extend toward the lift shaft 720. A pair of guide grooves 734 are formed on the outer surface of the lift shaft 720. The guide grooves 734 constitute the upper portion which extends along the longitudinal direction of the lift shaft 720, and the lower portion which is twisted for about 90 degrees. Guide pins 738 are engaged in the guide grooves 734.

The lift shaft 720 is moved (downward) along the direction indicated by an arrow 744 since its movement is defined by the guide pins 738 respectively engaged in the guide grooves 734. The lift shaft 720 is turned together with the clamp arm 742 for about 90 degrees clockwise and is then moved downward. On the other hand, when the lift shaft 720 is moved (upward) along the direction indicated by an arrow 746, the lift shaft 720 is moved upward together with the clamp arm 742 and is turned counterclockwise for 90 degrees. A housing 728 is fixed to surround the lower and side surfaces of the stopper rod 726. Spaces are formed between the ends of the stopper rod 726 and the housing 728. Compression springs 732 are arranged in the spaces, and balls 730 are disposed at the upper ends of the springs 732 to urge them upward.

Figure 26:
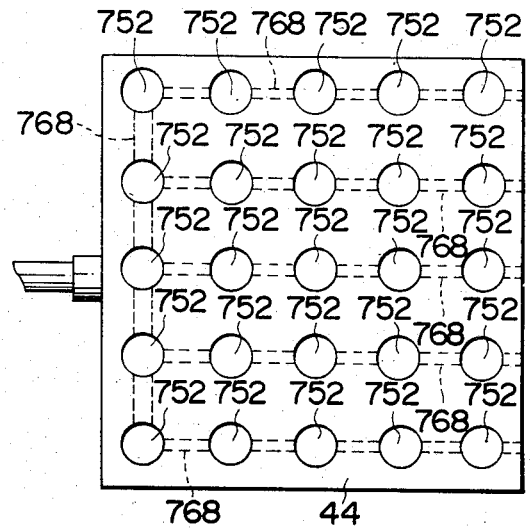
FIG. 26 is a plan view of a jig plate 44.

The compressing means 750 has a cylinder member 756 and a piston member 760 arranged in the cylinder member 756. Setting holes 752 are formed in the jig plate 44 so as to extend along the direction of its thickness. These setting holes 752 are formed in the jig plate 44 in a matrix form, as shown in FIG. 26. Each setting hole 752 is defined by the small, intermediate or large diameter columnar portions of the jig plate 44 on its upper surface (on which the work 60 is placed) respectively, and is thus defined by two steps. The cylinder member 756 is fitted in the intermediate and larger diameter portions which define the setting hole 752. The cylinder member 756 has a columnar recess 758 which is open to the upper surface of the cylinder member 756.

Compressed oil 770 is supplied to the recess 758 through a hydraulic path 768 of compressed oil. The piston member 760 is inserted in the recess 758 to oppose the cylinder member 756 in a liquid-tight manner. The piston member 760 has a small diameter columnar portion and a large diameter columnar portion integrally formed thereunder. A bush 764 is fitted on the small diameter columnar portion. The path 768 makes contact with the inner portion through an opening formed in the cylinder member 756. Compressed oil 770 is supplied between the bush 764 and the large diameter columnar portion of the piston member 760.

Figure 21:
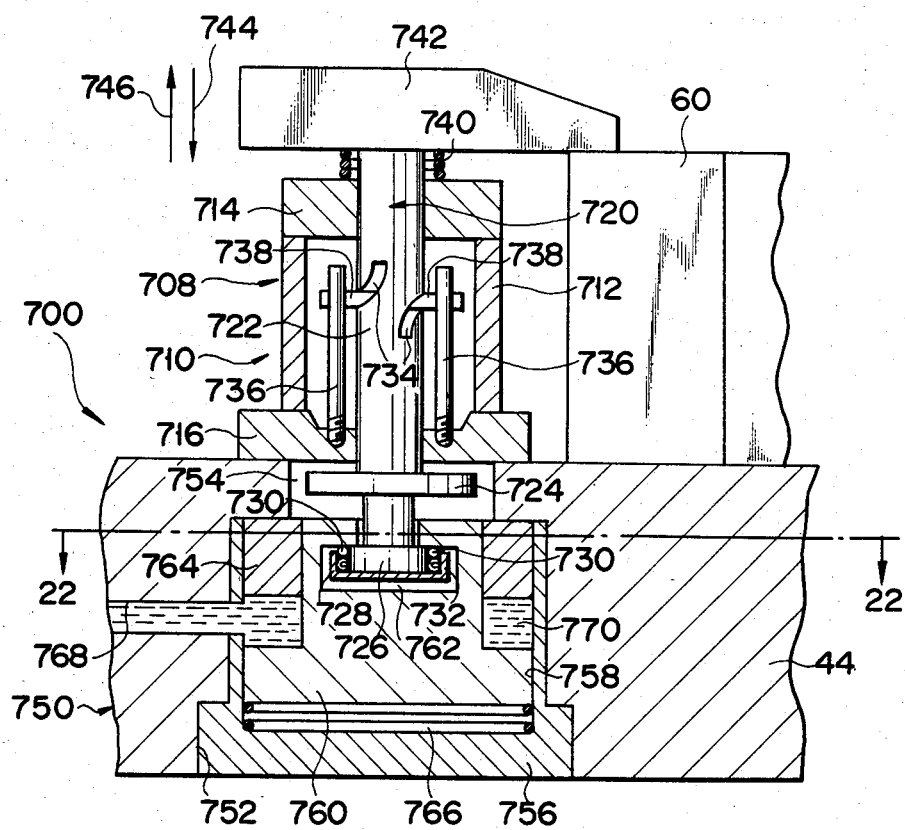
FIG. 21 is a longitudinal sectional view of the hydraulic clamp 700.

The small diameter columnar portion of the piston member 760 has a pair of sector-shaped engaging portions 762 each of which has as a center the central axis of the piston member 760, as shown in FIGS. 21 and 22. The engaging portions 762 are open at the upper surfaces of the piston member 760 since a pair of notches 772 are formed to oppose each other having the central axis of the piston member 760 as a center.

Therefore, the stopper rod 726 is inserted in the engaging portions 762 through the notches 772. When the stopper rod 726 is rotated in the direction indicated by an arrow 774 in FIG. 22, the stopper rod 726 is engaged with the engaging portions 762. The small diameter of the setting hole 752 forms a space 754. The stopper plate 724 fixed on the lift shaft 720 is located in the space 754. The stopper plate 724 can be vertically moved in the space 754.

Figure 20:
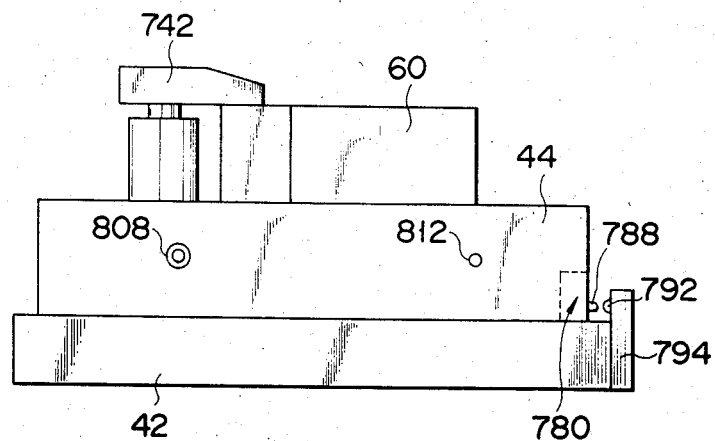
FIG. 20 is a side view showing the overall construction of a hydraulic clamp 700.

A clamp force detecting means 780 is arranged in the jig plate 44, as shown in FIGS. 20 and 23. A cylinder member 782 is embedded in the vicinity of the side surface of the jig plate 44 such that the opening faces downward. A piston member 784 is inserted in the cylinder member 782 to be vertically movable therein. A clamp force indicating member 786 is supported in contact with the lower end of the piston member 784 to be movable with respect to the piston member 784. The indicating member 786 has an indicating projection 788 extending laterally from the side surface of the jig plate 44. A compression spring 790 is arranged below the indicating member 786 to urge the member 786 upward. A support member 794 is fixed on the side surface of the support plate 42. A limit switch 792 is arranged on the support member 794 opposite of the indicating projection 788.

The indicating member 786 stops when the oil pressure is balanced with the biasing force of the spring 790. When the pressure of the compressed oil 770 decreases, the indicating member 786 is moved upward by the biasing force of the spring 790, so that the indicating projection 788 actuates the limit switch 792. Therefore, a decrease in hydraulic pressure can be detected by the operation of the limit switch 792.

Figure 24:
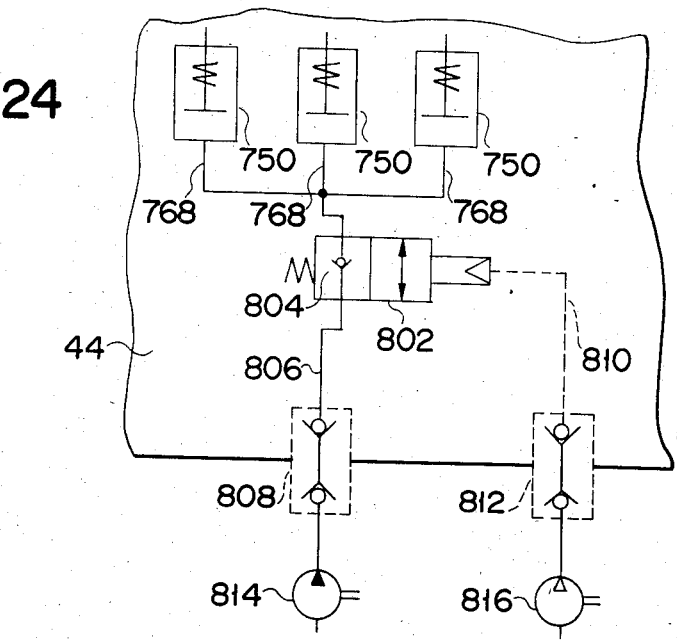
FIG. 24 is a hydraulic circuit diagram showing part of a hydraulic system of the hydraulic clamp 700.

Each hydraulic path 768 is guided to each setting hole 752 and the cylinder member 782. The pressure of the oil 770 acting on the compressing means 750 is substantially the same as that acting on the clamp force detecting means 780. As shown in FIG. 24, the hydraulic paths 768 are connected to a selector valve 802. The selector valve 802 comprises a two-port, two-position selector valve and has a check valve 804 therein. Air pressure is used as a pilot pressure to control the valve elements and in turn the working oil 770. The air is supplied from an air compressor 816 to an air coupler 812 as disposed on the side surface of the jig plate 44 shown in FIG. 20. The air is next supplied to the selector valve 802 through an air path 810. Besides the air compressor 816, hydraulic coupler 808 is also disposed on the side surface of the jig plate 44. The working oil 770 supplied from a hydraulic pump 814 is used as the hydraulic source for the hydraulic coupler 808 which is supplied to the selector valve 802 through a compressed oil path 806. In this manner, the cylinder member 756, the piston member 760, a compression spring 766, the selector valve 802, the paths 768 and 806, the hydraulic coupler 808, the air coupler 812 and the pipe 810 constitute the compressing means 750.

The operation of the hydraulic clamp 700 having the construction described above will next be described. The clamp means 708 is set in at least one setting hole 752 by the setting robot 200 in accordance with the shape and size of the work 60 to be set up on the jig plate 44. The gripper 210 of the setting robot 200 grips the clamp arm 742 of the clamp means 708 and conveys it above the setting hole 752. In this case, the support 710 is stopped by the stopper plate 724. The setting robot 200 moves the clamp means 708 downward and inserts the stopper rod 726 in the spaces 754 and further in the notches 772. After that, the setting robot 200 causes the lift shaft 720 to rotate in the direction indicated by the arrow 774 (see FIG. 22) to engage the stopper rod 726 with the engaging portions 762.

In this engaged state, the lift shaft 720 is located by the biasing forces of the springs 740 and 766 which are in the upper end position when the stopper plate 724 is in contact with the lower plate 716. The clamp arm 742 becomes parallel to the side surface of the work 60 to be placed on the jig plate 44. The oil supply head coupled to the hydraulic pump 814 is automatically fitted and coupled to the hydraulic coupler 808.

At the same time, the air supply head coupled to the air compressor 816 is automatically fitted and coupled to the air coupler 812. Air is supplied to the selector valve 802 from the air coupler 812 to produce pilot pressure. As the valve position of the selector valve 802 changes, oil pressure acts on the piston member 760 which is then moved downward in the direction indicated by the arrow 744. Upon the downward movement of the piston member 760, the stopper rod 726 engaged with the engaging portions 762 of the piston member 760 causes the lift shaft 720 to also move downward in the direction of the arrow 744. The guide pins 738 are guided along the guide grooves 734 to rotate the lift shaft 720 90 degrees while the shaft 720 is moved downward.

In other words, the lift shaft 720 is rotated through 90 degrees in a helical manner while the clamp arm 742 abuts against the upper surface of the work 60. When this happens, the upper-end portion of the stopper rod 726 is in contact with the piston member 760. So that pivotal movement of the lift shaft 720 can be smoothly performed, the balls 730 are inserted in the contact portions.

In summary, after the lift shaft 720 is rotated 90 degrees, the lift shaft 720 is moved downward until the hydraulic pressure of the compressed oil 770 is balanced with the biasing force of the compression spring 766. As a result, the work 60 is clamped with a large torque. When the work is completely clamped, air is no longer supplied from the air coupler 812 to the selector valve 802.

Simultaneously to the clamping of the work, the pipe 768 is disconnected from the pipe 806. A predetermined hydraulic level is held in the path 768. In this case, the compressed oil 770 will not flow back to the oil source 814 by means of the check valve 804. When the clamp force is not sufficient: the indicating projection 788 cannot actuate the limit switch 792 even if the selector valve 802 is switched to the communication position; the oil supply head and the air supply head are removed from the jig plate 44; and the cable for transmitting a signal from the limit switch 792 is separated by means of a coupler.

Next, the pallet 40 which clamps the work 60 is conveyed to the automatic machine tool, and the work 60 is subjected to the predetermined machining. That is, the transmission cable of the limit switch 792 is connected through a coupler to a transmission cable of a signal processor arranged in the automatic machine tool.

If the hydraulic pressure (clamp force) of the pipe 768 is not sufficiently high, the biasing force of the compression spring 790 will be greater than the hydraulic pressure, and the indicating projection 788 must be stopped at a higher level than that normally applied by the clamp force. Therefore, when the limit switch 792 is arranged at the lowest clamp force position, the indicating projection 788 contacts the limit switch 792 which then generates an abnormal detection signal indicating that the clamp force is not sufficiently high. Even if the clamp force is decreased due to premachining procedures or during machining itself, the indicating projection 788 of the clamp force detecting means 780 is brought into contact with the limit switch 792 to automatically detect the abnormal decrease in clamp force. In this way the operation is done smoothly and safely.

When the work 60 is machined, the work 60 and the pallet 40 are returned to the setting table 100. The oil supply head and the air supply head are coupled to the hydraulic coupler 808 and the air coupler 812, respectively. Air is supplied to the selector valve 802 through the air coupler 812, thus introducing the pilot pressure. The path 806 contacts the path 768 which then decreases its hydraulic pressure. The piston member 760 is moved upward returning to its initial position by the biasing force of the compression spring 766. In contrast, the lift shaft 720 is moved to follow the piston member 760 by the biasing force of the compression spring 740. The setting robot causes the lift shaft 720 to rotate in a direction opposite to the direction indicated by the arrow 774, so that the clamp means 708 is removed from the jig plate 44 and is returned to the jig table 240. In the illustrative embodiment, one work 60 and one clamp means 708 are placed on the jig plate 44. However, the amount of work or number of clamp means is not limited. For example, a plurality of works 60 and corresponding clamp means 708 can be placed on the jig plate.

Figure 25:
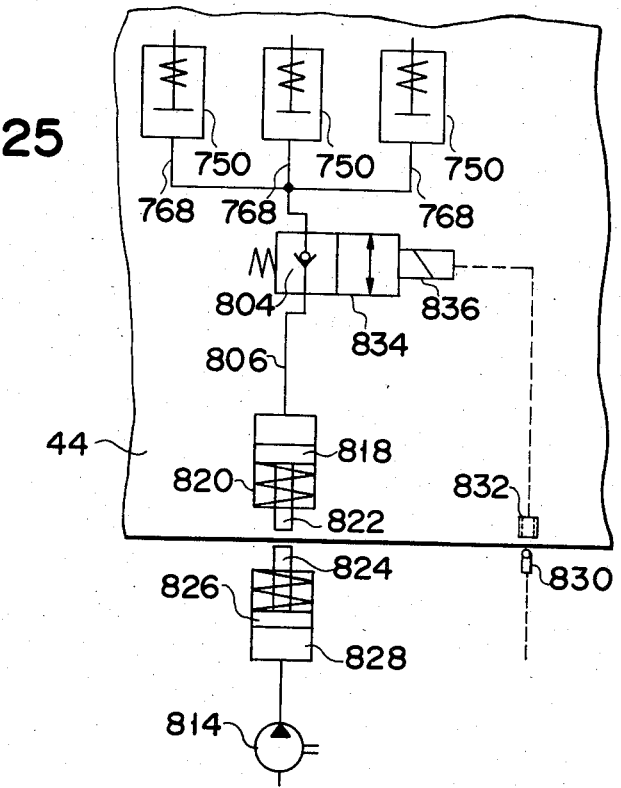
FIG. 25 is a hydraulic circuit diagram showing a modification of the hydraulic system.

In the above embodiment, the hydraulic pressure control is performed such that compressed oil 770 is supplied by the hydraulic pump 814 to the pipe 806 through the hydraulic coupler 808. The present invention is not limited to this oil supply system. For example, as shown in FIG. 25, a pressure-receiving cylinder member 820 connected to a compressed oil pipe 806 is embedded in the side surface of the jig plate 44, and a pressure-receiving piston member 818 is slidably fitted in the cylinder member 820 in an oil-tight manner. A pressure-receiving shaft 822 is coaxially coupled to the pressure-receiving piston member 818, and the distal-end portion of the pressure-receiving shaft 822 extends from the side surface of the jig plate 44. The pressure-receiving shaft 822 is coaxial with a shaft 824 which is in turn, coaxial with a piston member 826. The piston member 826 is slidably fitted in an oil-tight manner in a cylinder member 828 which is coupled to a hydraulic pump 814.

Further, an external plug 830 is inserted in a jack 832 which is embedded in the side surface of the jig plate 44. An electromagnetic coil 836 of a selector valve 834 is energized through the plug 830, so that the path 768 contacts the path 806. Subsequently, the hydraulic pump 814 is started to urge the pressure-receiving shaft 822 by means of the clamp shaft 824. A predetermined hydraulic pressure acts on the path 768.

In this manner, the work 60 can be clamped. In this state, when the electromangnetic coil 836 of the selector valve 834 is deenergized from the plug 830, the selector valve 834 then serves as a check valve 804. The hydraulic pressure is held in the path 768 by means of the check valve 804. Under these conditions, the work 60 is clamped continuously.

In order to release the work 60, the electromagnetic coil 836 of the selector valve 834 is energized again through the plug 830, and the selector valve 834 is switched on. Hydraulic pressure leakage is substantially prevented by the compressing means 750 shown in FIG. 25, thereby prolonging the clamping period reliably. In this case, the flow path selection is performed by an electromagnetic valve. However, as shown in FIG. 24, air pressure can also be used, and the operation of the selector valve 802 in FIG. 24 can also be performed by the electromagnetic valve.

In addition, to the above embodiment, the clamp force can be detected by a contact between the indicating projection 788 and the limit switch 792. However, as a magnetic member is mounted at the distal end of the indicating projection 788, the position of the indicating projection 788 can be detected by a magnetic sensor. Alternatively, the position of the indicating projection 788 can be detected by a photoelectric switch. Further, the clamp force can be detected either on the NC table of the automatic machine tool or on the setting table. When the clamp force is detected on the setting table, the position detectors are arranged at the upper limits of their unloading positions, and at the lower limits of their loading positions. In this way, the completion of the loading and unloading process can be automatically detected. A pilot operation check valve (as one of the direction regulating valves) can be used to stop or start the flow of oil or air instead of using the selector valves 802 and 834.

The hydraulic clamp 700 is arranged so that any number of a variety of clamp means 708 can be detachably mounted on the jig plate 44. The clamp force itself is applied by a compressing means 750 which is disposed inside the jig plate 44 and which can be disconnected from the external hydraulic source 814. Therefore, the jig plate 44 and the work 60 can be conveyed, processed, and stored while the clamp force is applied to the work 60. In particular, the set-up/loading station and the storage warehouse in the FMS can be easily automated. And the clamp force detecting mechanism is so arranged, that machining can be interrupted, that clamping can be checked, or that the work can be clamped again if the clamp force decreases before or during machining. The overall efficiency of the mechanism is improved as downtime caused by injury accident is eliminated, and as the yield is greatly improved. Also, running costs, such as the cost of tools, can be decreased.

Figure 27:
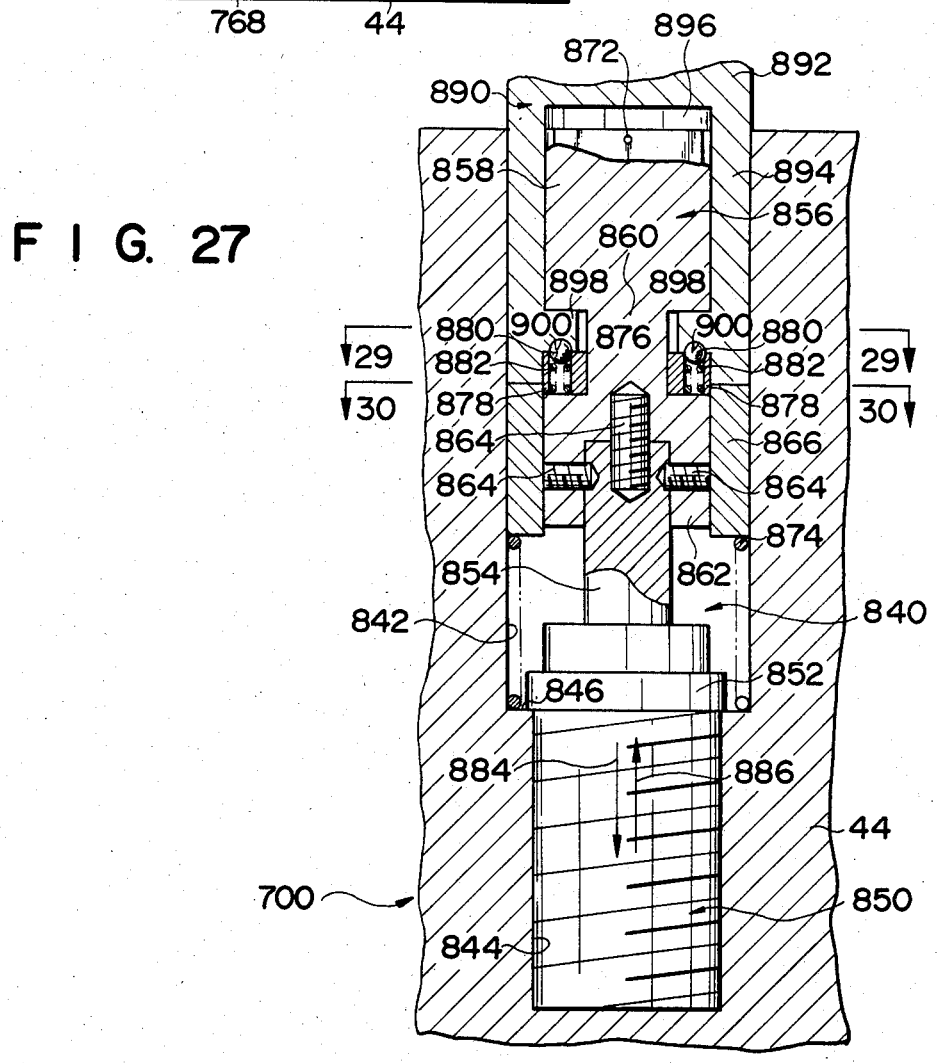
FIG. 27 is a longitudinal sectional view showing a modification of a hydraulic clamp 700.
Figure 28:
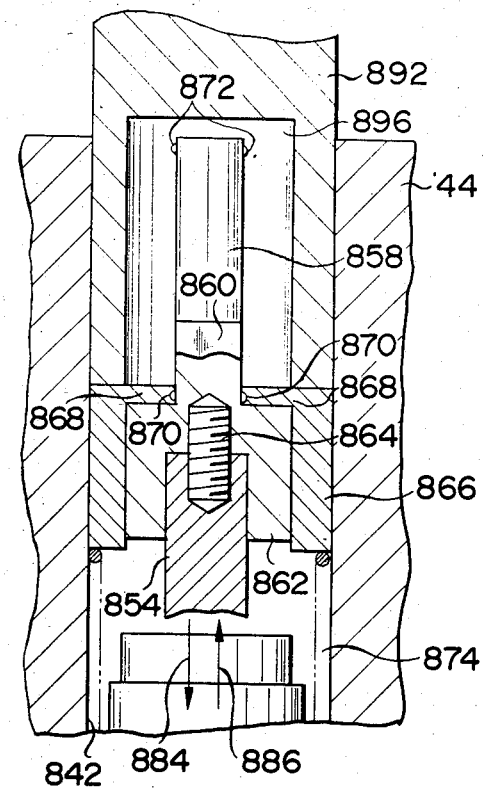
FIG. 28 is a partial longitudinal sectional view of the modification shown in FIG. 27.
Figure 29:
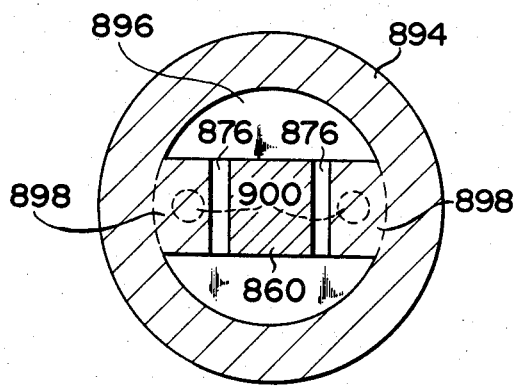
FIG. 29 is a cross-sectional view of the modification of FIG. 27 taken along the line 29—29 thereof.
Figure 30:
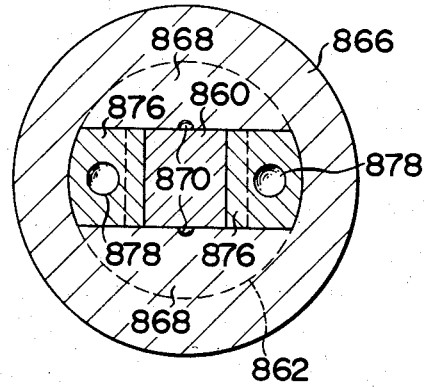
FIG. 30 is a cross-sectional view of the modification of FIG. 27 taken along the line 30—30 thereof.

Another embodiment of the hydraulic clamp 700 will be described with reference to FIGS. 27 to 30. FIG. 27 is a longitudinal sectional view showing the overall configuration of the hydraulic clamp 700 of this embodiment. FIG. 28 is a partial longitudinal sectional view thereof when a piston rod 854 is rotated 90 degrees, and FIGS. 29 and 30 are, respectively, sectional views thereof along the line 29—29 and the line 30—30 of FIG. 27. In the same manner of the embodiment shown in FIGS. 20 to 26, a plurality of setting recesses 840 is formed in a jig plate 44 in a checkerboard manner (see the setting holes 752 of FIG. 26). Each setting recess 840 has a large diameter hole 842 which opens to the upper surface of the jig plate 44, and a small diameter female thread hole 844 formed continuously therebelow. A step 846 is formed between the large diameter hole 842 and the female thread hole 844. Then, a swing cylinder 850 is screwed in the female thread hole 844. Next, compressed oil is supplied to the swing cylinder 850 through a compressed oil pipe 768 (see FIG. 26). The swing cylinder 850 has a collar 852 at its upper end. It is screwed into the female thread hole 844 until the collar 852 abuts against the step 846 of the setting recess 840.

The swing cylinder 850 also has an oil chamber (not shown) in which a piston (not shown) is inserted. Pressurized oil from the oil chamber moves the piston in the direction indicated by an arrow 884. When the hydraulic pressure is released from the oil chamber, the piston is moved by a compression spring (not shown) inserted between the bottom of the swing cylinder 850, and by the piston in the direction indicated by an arrow 886, so that the piston returns to the initial position. A piston rod 854 is fixed to be coaxial with the piston. The piston rod 854 extends upward from the swing cylinder 850. The swing cylinder 850 contains a swing mechanism. While the piston is moved downward from the upper end position in the direction given by an arrow 890, it is rotated along with the piston rod 854 by 90 degrees by means of the swing mechanism. On the other hand, while the piston is moved upward from the lower end position along the direction given by the arrow 886, the piston with the piston rod 854 is moved upward and is then rotated 90 degrees in the direction opposite to the downward movement. The piston rod 854 is thus set in the upper position.

A connecting member 856 is connected by a bolt 864 at the upper-end of the piston rod 854. The connecting member 856 has an upper portion 858, an intermediate portion 860, and a lower portion 862. The lower portion 862 has a smaller diameter than the hole 842 and is fixed by the bolt 864 to be coaxial with the piston rod 854. The upper portion 858 has the same diameter as the lower portion 862 and has notches on its outer surface at equal angular intervals. As shown in FIG. 28, the upper portion 858 has a plate-like shape. In other words, the upper portion 858 comprises two opposing flat-side surfaces and two opposing arcuated side surfaces which are curved with the same radius of curvature as that of the side surface of the lower portion 862. The intermediate portion 860 has a rectangular cross section. A pair of side surfaces of the intermediate portion 860 is level with the flat surfaces of the upper portion 858, as shown in FIG. 28.

A pair of engaging members 876 is disposed in the lower part of the intermediate portion 860. The engaging members 876 are fixed on the connecting member 856. One pair of side surfaces of the engaging members 876 is level with the flat surfaces of the upper portion 858, as shown in FIGS. 29 and 30. Another pair of side surfaces of the engaging members 876 is in contact with the side surface of the intermediate portion 860, while a third pair is arcuated with the same radius of curvature as that of the lower portion 862. Each engaging members 876 has a hole 878 extending along the longitudinal direction of the connecting member 856. A compression spring 882 is inserted in the hole 878, and an engaging ball 880 is placed on the upper end of the compression spring 882, so that the ball 880 is biased upward by the compression spring 882.

A sliding member 866 is disposed between the connecting member 856 and a wall surface of the hole 842. The sliding member 866 has a cylindrical shape, and has the same inner diameter as the lower portion 862, and the same outer diameter as the diameter of the hole 842. The sliding member 866 has a pair of stoppers 868 at its upper end. The stoppers 868 cover the upper surface of the lower portion 862 which is not covered by the engaging members 876, as shown in FIG. 30. The opposing side surfaces of the stoppers 868 are brought into contact with the side surfaces of the intermediate portions 860 where semispherical recesses 870 are formed. Engaging balls 872 are disposed on the pair of flat side surfaces of the upper end of the upper portion 858. Each engaging ball 872 can move in or out of the upper portion 858 and is biased by a spring or the like to the extend that the upper half of the ball can be seen from the corresponding flat upper surface.

A compression spring 874 is inserted between the lower surface of the sliding member 866 and the step 846 to bias the sliding member 866 upward when it has a sliding contact with: the surface of the hole 842; the surface of the lower portion 862; and two side-surface pairs of the upper portion 858. The sliding member 866 stops when the balls 872 are fitted in the recesses 870. When this happens, the upper surface of the sliding member 866 has the same level as that of the upper portion 858. As a result, dust and other foreign materials can not be introduced in the setting recess 840. On the other hand, when the sliding member 866 is moved downward (indicated by an arrow 884) against the biasing force of the spring 874, the stoppers 868 abut against the upper surface of the lower portion 862, and the sliding member 866 is stopped.

The hydraulic clamp 700 of this embodiment has a clamp means 890. The clamp means 890 has a lift shaft 892 and a clamp arm (see clamp arm 742 in FIGS. 20 and 21) fixed at the upper end of the lift shaft 892. The lift shaft 892 comprises a columnar member whose outer diameter is substantially the same as that of the hole 842 of the setting recess 840. An engaging portion 894 formed in the lower portion of the lift shaft 892 has a columnar space 896 whose diameter is substantially the same as that of the lower portion 862 of the connecting member 856. When the connecting member 856 is inserted in the space 896 defined by the engaging portion 894, the engaging portion 849 can be inserted in the hole 842.

When the engaging portion 894 is inserted in the hole 842, the sliding member 866 is moved downward in the direction indicated by the arrow 884 against the biasing force of the spring 874, and the stoppers 868 abut against the upper surface of the lower portion 862. Engaging projections 898 are formed in the inner surface of the engaging portion 894 to extend into the space defined by the upper portion 858 and the engaging portions 876 (FIGS. 27 and 29). Semispherical recesses 900 which engage the balls 880 are formed in the lower-surface portions of the engaging projections 898. Therefore, the engaging portion 894 is moved downward while the engaging projections 898 are perpendicular to the engaging portions 876. In other words, the engaging portion 894 is inserted in the hole 842. When the stoppers 868 of the sliding member 866 abut against the upper surface of the lower portion 862, the engaging portion 894 is rotated 90 degrees, so that the engaging balls 880 are fitted in the recesses 900. As a result, the lift shaft 892 is coupled to the connecting member 856.

The operation of a hydraulic clamp having the construction described above will now be described. The clamp means 890 is placed on a jig table 240. The setting robot 200 grips the clamp means 890 and conveys it from the jig table 240 to a position above the jig plate 44 on the setting table. The setting robot 200 sets the clamp means 890 in predetermined setting recesses 840 in accordance with the shape of the work 60. The setting robot 200 moves the lift shaft 892 downward while the opposing direction of the engaging projections 898 are perpendicular to that of the engaging portions 876, so that the engaging portion 894 is inserted in the hole 842. The sliding member 866 is located in the upper position where the engaging balls 872 are fitted in the recesses 870. The sliding member 866 continues to move downward toward the engaging portion 894 until the stoppers 868 abut against the upper surface of the lower portion 862. The setting robot 200 causes the lift member 892 to rotate 90 degrees so it can insert the engaging projections 898 between the engaging portions 876 and the upper portion 858, so that the engaging balls 880 are fitted in the recesses 900. As a result, the lift shaft 892 is coupled to the connecting member 856. In this state, the direction of the connecting member 856 is set such that the clamp arm (not shown) of the clamp means 890 is parallel to the side edges of the work 60.

Subsequently, the work 60 is placed by the convey unit 400 on the jig plate 44. In the same manner as the embodiment shown in FIGS. 20 to 25, the oil supply head connected to a hydraulic pump 814 is automatically coupled to a hydraulic coupler 808, and pressurized oil is supplied to the swing cylinder 850. The piston rod 854 is moved downward (along the arrow 884) while it is rotated 90 degrees. The clamp arm of the clamp means 890 is also rotated 90 degrees so that the distal end of the clamp arm is located immediately above the work 60. The piston rod 854 is further moved downward to move the clamp arm in the same direction. Finally, the work 60 is clamped between the clamp arm and the jig plate 44. The oil supply head is decoupled from the hydraulic coupler 808, and the work 60 together with the pallet 40 is conveyed to an automatic machine tool.

The work 60 and the pallet 40 which have been subjected to machining and cleaning are placed on the setting table 100 again. The oil supply head is automatically coupled to the hydraulic coupler 808, and pressurized oil is removed from the swing cylinder 850. The piston rod 854 and the lift shaft 892 are slightly moved upward (along the arrow 886) and are rotated 90 degrees in the opposite direction to the direction of the downward movement. The clamping of the work 60 is thus released, and the work 60 is conveyed by the convey unit 400. The setting robot 200 grips the clamp means 890 to rotate the lift shaft 892 90 degrees. The engaging balls 880 are disengaged from the recesses 900. The engaging projections 898 are removed from the space between the upper portions 858 and the engaging portions 876. The setting robot 200 is then removed upward from the lift shaft 892 and is conveyed onto the jig table 240. The sliding member 866 is moved upward by the biasing force of the spring 874 is stopped where the engaging balls 872 are engaged with the recesses 870.

Indexing of the lower end of the lift shaft 892, upon its insertion and before its pivotal movement, can be performed through a contact between the upper-end surface of the connecting member 856 and the upper-surface of the lift shaft 892 which defines the space 896. In addition, the arrangement of the swing cylinder 850 need not be in a checkerboard manner; a concentric arrangement can be utilized. Instead of the engagement means between the lift shaft 892 and the connecting member 856 as described in the above embodiment, an engaging hole may be formed in the connecting member and a projection may be formed on the lift shaft to engage it between the engaging hole and the projection. In addition to this modification, the engaging portion 894 of the lift shaft 892 may have a columnar shape, and the connecting member 856 may be provided with a collet chuck. If this is true, the lift shaft 892 is inserted in the collet chuck.

Furthermore, an accumulator in the path 768 may be used to hold the hydraulic pressure constant. The cylinder member of the swing cylinder 850 may be a double-acting cylinder which can reciprocate fluid pressure.

In the clamp 500 for mechanically clamping the work 60 on the jig plate 44, or in the clamp 700 for hydraulically clamping the work 60 on the jig plate 44, the clamp is kept separate from the jig plate, so that each clamp is mounted at the proper positions for the shape of the work to be done. Therefore, the jig plate can be used for any shape of work. However, when a special jig plate for a specific work having a predetermined shape is used, the clamps can be preset on the jig plate, thereby omitting the setting operation of the clamps on the jig plate.

Figure 32:
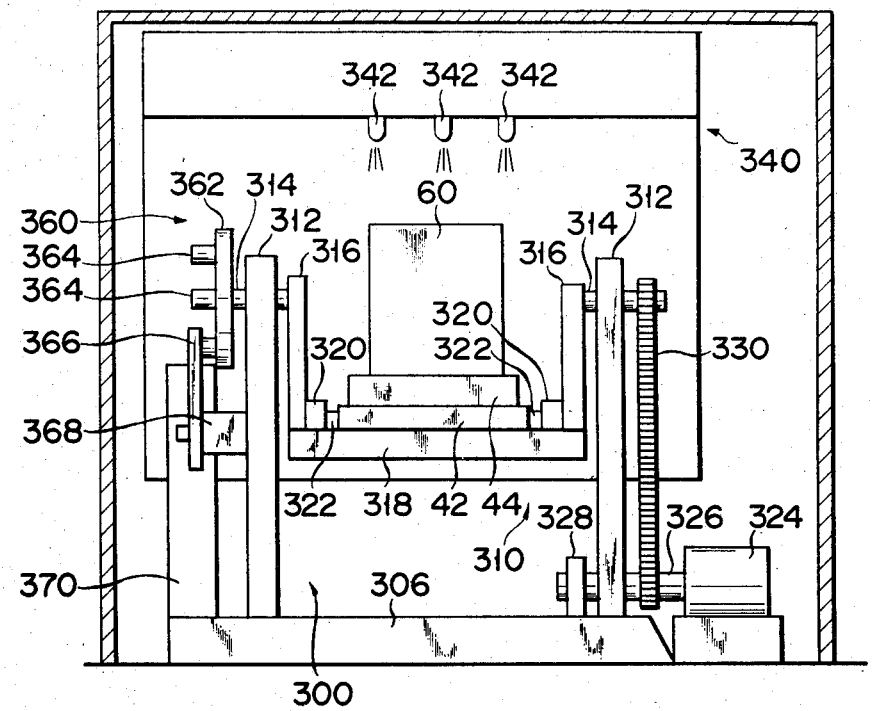
FIG. 32 is a side view of the cleaner 300.
Figure 33:
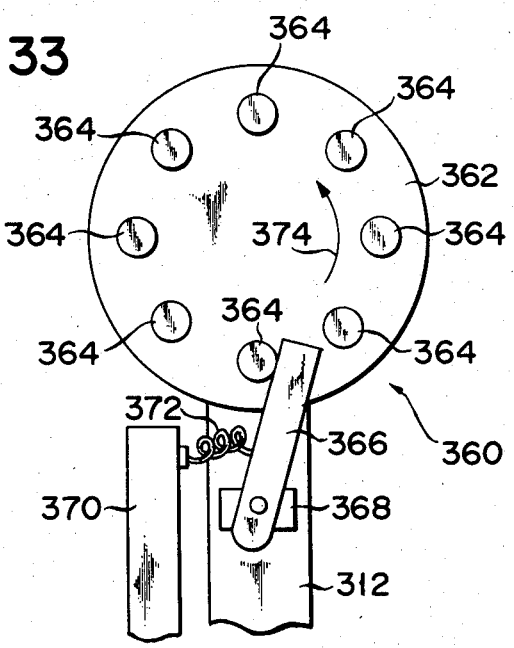
FIG. 33 is a side view of a vibrating means 360 of the cleaner 300.

The cleaner 300 will be described with reference to FIGS. 31 to 33. The cleaner 300 has: a holding means 310 for holding the work 60 and the pallet 40; a spraying means 340 for spraying a cleaning solution; and a vibrating means 360. A pair of columns 312 of the holding means 310 extend upward from a base 306 in a housing 302 of the cleaner 300. A rotating shaft 314 is rotatably supported at the upper end of each column 312. L-shaped holding members 316 are fixed at bend portions of the opposing sides of the rotating shafts 314. A holding plate 318 is fixed at the lower ends of the holding members 316. The holding plate 318 can be rotated about the rotating shafts 314 through the holding members 316. The processed work 60 is placed together with the jig plate 44 and the support plate 42 on a stand 18, and is moved onto the holding plate 318 through a feed table 304. Clamp devices 320 are disposed in the vicinity of the holding members 316 on the holding plate 318 opposite of each other. When an ON signal is supplied to the clamp devices 320, actuators 322 of the clamp devices 320 extend toward the support plate 42, so that the support plate 42 is clamped by the actuators 322. The work 60 and the pallet 40 are fixed on the holding plate 318. A motor 324 is installed in the vicinity of one of the columns 312. A drive shaft 326 of the motor 324 is aligned with the rotating shafts 314 and is extended through the corresponding column 312. The distal end of the drive shaft 326 is rotatably supported by a shaft support plate 328. A chain 330 is looped between the rotating shaft 314 and the drive shaft 326. When the motor 324 is driven, the rotational force is transmitted to the rotating shafts 314 through the chain 330, so that the holding plate 318 is rotated about the rotating shafts 314.

The vibrating means 360 has: a vibrating disk 362; a plurality of projections 364 formed on the vibrating disk 362; and a vibrating rod 366 which strikes the projections 364. The vibrating disk 362 is fixed to the rotating shaft 314 which is not coupled to the chain 330 so that the surface of the disk 362 is perpendicular to the axial direction of the rotating shaft 314. The columnar projections 364 (eight projections in this embodiment) are formed on the vibrating disk 362 at equal angular intervals around its periphery. A lateral member 368 is mounted on the column 312. The vibrating rod 366 is rotatably mounted on the lateral member 368. A subcolumn 370 extends upward from the base 306 in the vicinity of the column 312. A tension spring 372 is hooked between the subcolumn 370 and the rod 366, so that the rod 366 is biased by the spring 372 toward the subcolumn 370. The upper end of the rod 366 is stopped by each projection 364. When the holding plate 318 is rotated by the motor 324, the disk 362 is rotated in the direction indicated by an arrow 372. The rod 366 is also moved together with the projection 364 in the direction indicated by the arrow 372. When the rod 366 is disengaged from the projection 364, the rod 366 is moved toward the subcolumn 370 by the biasing force of the spring 372 and it strikes the next projection 364. In this manner, the rod 366 continuously strikes the projections 364 upon rotation of the disk 362. Vibrations due to the striking forces are transmitted to the work 60 and the pallet 40 through the holding plate 318.

The spraying means 340 has a plurality of spray nozzles 342. The nozzles 342 are mounted on an arcuated holding member 344 and are directed toward the center of the holding member 344. The holding member 344 is supported by the housing 302 and is movable toward the rotating shafts 314 in a back-and-forth direction along arrows 348. A tank 350 for storing a cleaning liquid such as water is installed outside the housing 302. The cleaning liquid in the tank 350 is supplied to the holding member 344 through a pipe 354 by means of a pump 352. The cleaning liquid flows through the inside of the holding member 344 and is supplied to the nozzles 342. The cleaning liquid is sprayed from the nozzles 342 toward the work 60 and the pallet 40 which are fixed on the holding plate 318. The cleaning liquid in the housing 302 returns to the tank 350.

The operation of the cleaner 300 having the construction described above will be described. The processed work 60 is conveyed by the unmanned vehicle 30 (FIG. 1) on the shuttle table 20 and is placed on the stand 18. The work 60 and the pallet 40 are inserted by the feed table 304 inside the housing 302 of the cleaner 300 and are placed on the holding plate 318. The support plate 42 is clamped by the clamp devices 320, so that the work 60 and the pallet 40 are fixed on the holding plate 318. Subsequently, the pump 352 is started, and the cleaning liquid is sprayed from the spray nozzles 342 to the work 60 and the pallet 40 to remove the dust and cutting chips thereon. The cleaning liquid returns from the bottom of the housing 302 to the tank 350 and is reused. The motor 324 is energized at the same time as the pump 352 is started, and the holding plate 318 is rotated. The work 60 and the pallet 40 are rotated about the rotating shafts 314. The disk 362 is rotated in the direction along the arrow 372 upon rotation of the motor 324, so that the rod 366 strikes the projections 364 one at a time. Since the work 60 and the pallet 40 are rotated, the cleaning liquid reaches all areas of the work 60 and the pallet 40. Meanwhile, the vibrating means 360 gives intermittent vibrations to the work 60 and the pallet 40 so that any other debits caught between the contact portions and in the recesses of the work 60 and the jig plate 44 can be completely removed. The holding member 344 of the nozzles 342 is moved in the direction along the arrows 348 in accordance with the shape and size of the work 60 and the pallet 40 to be cleaned. As a result, the work 60 and the pallet 40 can be effectively cleaned.

When a neutral detergent or an organic solvent is used as the cleaning liquid in place of water, a cutting oil attached to the work can also be effectively removed from the work. In addition to this modification, a gear array in place of the chain 330 may be used to transmit the rotational force of the motor 324 to the rotating shafts 314.

When using the cleaner 300, the work and pallet are rotated, intermittently vibrated, and sprayed with the cleaning liquid to remove the cutting chips, the cutting oil or the like. Therefore, all portions of the work and pallet can be automatically, completely and quickly cleaned.

Figure 34:
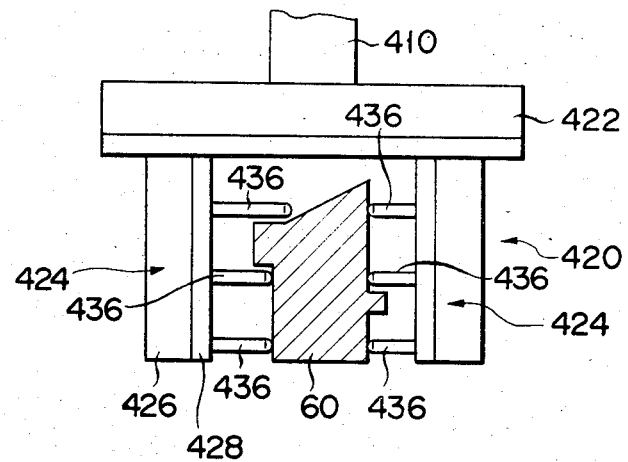
FIG. 34 is a side view showing a modification of a grip means 420.
Figure 35:
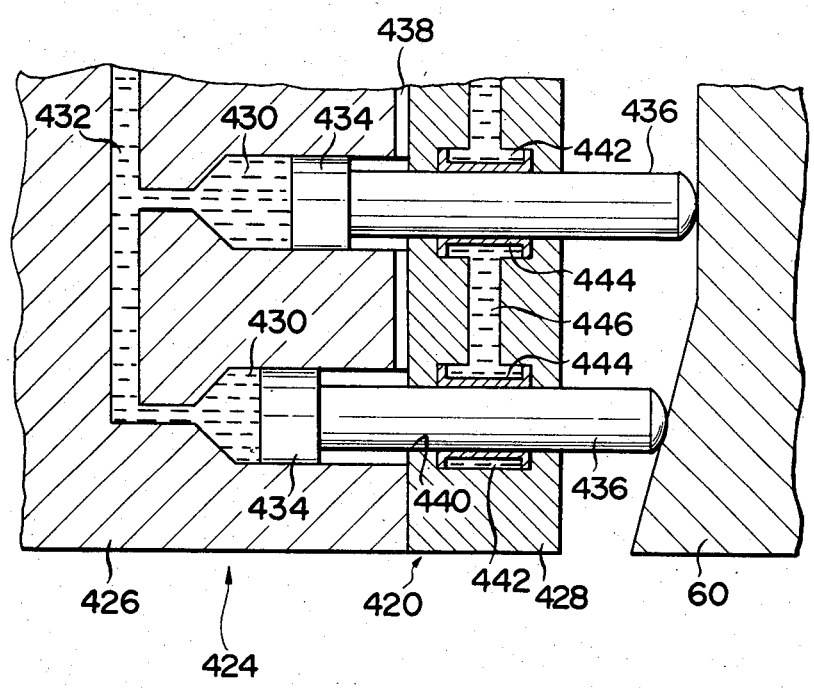
FIG. 35 is a partial longitudinal sectional view of the grip means 420.

A modification of the grip means 420 of the convey unit 400 will be described with reference to FIGS. 34 and 35. FIG. 34 shows the overall configuration of the modification, and FIG. 35 is a partially enlarged sectional view thereof. A support plate 422 is fixed at the lower end of the lift member 410 such that the longitudinal direction of the lift member 410 is substantially perpendicular to the surface of the support plate 422. A pair of arms 424 is supported on the lower surface of the support plate 422 which can become movable along the opposing direction of the arms 424 by means of, for example, a hydraulic cylinder. Each arm 424 has on the inside, a clamp member 428, and on the outside, a press member 426. Each press member 426 has columnar cylinders 430 which extend along the direction of the opposing arms 424 and which open at the side surface of the clamp member 428. These cylinders (three in this embodiment) are parallel to each other are are perpendicular to the lift member 410. The cylinders 430 are connected to a first hydraulic source such as a first hydraulic motor (not shown) through a compressed oil path 432.

When the first hydraulic motor is started, the pressurized oil is supplied to the cylinders 430 through the path 432. A piston 434 and a clamp rod 436 are slid into each cylinder 430. Each clamp rod 436 extends outward from a corresponding through hole 440 and from the exposed surface of the clamp member 428 in the opposite direction of the opposing arms 424. The portion of each cylinder 430 which is located in the clamp member 428 side contacts the outer atmosphere through a space 438. When pressurized oil is supplied to the cylinders 430 and when the pistons 434 are moved opposite from the opposing arms 424, respectively, air escapes from the portion of the cylinder located in the clamp member 428. An annular space 442 is formed in the proper portion of each through hole 440 through which the clamp rod 436 is inserted. A thin metal sleeve 444 is mounted in each space 442 and is fitted around the corresponding clamp rod 436. Then, each clamp rod 436 is moved toward the opposing arm 424 while it is brought into sliding contact with the corresponding sleeve 444. The spaces 442 are coupled to a second hydraulic source such as a second hydraulic motor (not shown) through a compressed oil path 446. When the pressurized oil is supplied to the spaces 442 through the path 446 by means of the second hydraulic motor, the sleeves 444 are urged against the clamp rods 436. As a result, the clamp rods 436 are firmly fixed by the clamp members 428.

The operation of the grip means 420 having the construction described above will be described. When the first and second hydraulic motors do not supply the pressurized oil to the paths 432 and 446, and when the clamp rods 436 are withdrawn in the arms 424, the convey unit 400 is moved back-and-forth and laterally to position the lift member 410 directly above the work 60 to be conveyed. The lift member 410 is moved downward such that the arms 424 are located at two sides of the work 60. The first hydraulic motor is driven to supply the pressurized oil in the cylinders 430 through the path 432. The clamp rods 436 are moved toward the opposing arms 424 and abut against the corresponding side walls of the work 60. In this case, even if the work 60 has a complex shape, the clamp rods 436 can be brought into tight contact with the sides surfaces of the work 60. Since the cylinders 430 coordinate with each other, the clamp rods 436 clamp the work with a uniform hydraulic force. When the portion of the work 60 is not present in the range of movement of the clamp rod 436, the corresponding piston abuts against the clamp member 428, so that the corresponding clamp rod 436 stops.

Subsequently, the second hydraulic motor is started to supply the pressurized oil in the spaces 442 through the path 446. The sleeves 444 are urged against the clamp rods 436 to clamp them. Therefore, the clamp rods 436 are fixed by the clamp members 428, so that the work 60 is clamped by the clamp rods 436. In this state, the lift member 410 is moved upward, and the convey unit 400 conveys the work 60 to a predetermined position.

After the work 60 is placed in the predetermined position, the pressures of the first and second hydraulic means are released from the pistons 434 and the sleeves 444 to widen the distance between the arms 424. The clamp rods 436 are removed from the work 60, so that the work 60 is released. The lift member 410 is then moved upward to narrow the distance between the arms 424, and the opposing clamp rods 436 abut against each other. As a result, the clamp rods 436 are withdrawn into the arms 424.

The present invention is not limited to the above embodiment. For example, two pairs of arms 424 may be provided to clamp the work from four directions. The number of clamp rods 436 may be arbitrarily determined in accordance with the size, shape and weight of the work to be gripped. In the above embodiment, the arms 424 are opened or closed by parallel movement. However, a link mechanism may be used to pivot the arms to be opened or closed. In addition to this modification, the clamp rods 436 are pressurized to move forward, and are moved backward upon withdrawal of the pressurized oil. In this above embodiment, two hydraulic sources are used. However, only one hydraulic source may be selectively used to switch to one of the paths 432 and 446. In addition, a plurality of slits may be formed on the inner surface of each of the sleeves 444 to increase their clamping force.

In the grip means of this embodiment described above, the work can be properly clamped irrespective of the shape of the work. Even if a work has a complex shape, it can be properly gripped. A special grip means for each work having predetermined size and shape need not be prepared. Therefore, the storage space for various types of special grip means can be saved, and replacement time of the grip means can be saved, thereby increasing the utilization efficiency of the automatic machine tool and greatly decreasing the installation expenses.

What is claimed is:

1. An automatic set-up system for setting up a work to be processed by a flexible manufacturing system automatic machine tool, comprising:
    a pallet on which said work is mounted;
    a setting table on which said pallet having said work thereon is placed;
    a convey unit having grip means for sequentially gripping and conveying said pallet and the work onto said setting table;
    a clamp mounted on said pallet to clamp and fix the work on said pallet;
    a cleaner for cleaning the work and said pallet which are fixed together by said clamp;
    feeding means for delivering the work and said pallet which are fixed together by said clamp to the automatic machine tool and for feeding a processed work and said pallet to said cleaner;
    a setting robot and a jig table on which said clamp is placed, said setting robot having a lift arm, a turning arm supported by said lift arm and arranged to turn along the horizontal direction with respect to said lift arm;
    lifting means for vertically moving said lift arm;
    turning means for turning said turning arm; and
    a gripper for gripping said clamp supported at a distal end of said turning arm, said lift arm being moved upward by said lifting means and said turning arm being turned by said turning means after said gripper grips said clamp on said jig table, and thereafter said lift arm being moved downward by said lifting means to set said clamp at a predetermined position of said pallet placed on said setting table.

2. A system, according to claim 1, wherein said lifting means has: a base; support rods extending on said base to support said lift arm such that said lift arm can vertically move; a screw rod extending on said base and extending through said lift arm; and a drive member for rotating said screw rod in one of forward and reverse directions, said lift arm being vertically moved when said drive member rotates said screw rod in the forward and reverse directions.

3. A system, according to claim 2, wherein said turning arm is supported on said lift arm such that said turning arm is rotatable about a vertical rotational axis, and said turning means has a motor for rotating said turning arm.

4. A system, according to claim 1, further comprising: a setting robot and a jig table on which said clamp is placed, said setting robot having a lift arm, a plurality of turning arms coupled to each other and capable of turning horizontally having a distal turning arm being supported by an adjacent turning arm to be turned horizontally, a proximal turning arm being supported by said lift arm to be turned horizontally; lifting means for vertically moving said lift arm; turning means for turning said plurality of said turning arms; and a gripper supported at a distal end of said distal turning arm to grip said clamp, said lift arm being moved upward by said lifting means and said plurality of turning arms being turned by said turning means after said gripper grips said clamp placed on said jig table, and thereafter said lift arm being moved downward by said lifting means to set said clamp at a predetermined position of said pallet placed on said setting table.

5. A system, according to claim 4, wherein said lifting means has: a base, support rods extending on said base to support said lift arm such that said lift arm can vertically move; a screw rod extending on said base and extending through said lift arm; and a drive member for rotating said screw rod in one of forward and reverse directions, said lift arm being vertically moved when said drive member rotates said screw rod in the forward and reverse directions.

6. A system, according to claim 5, wherein said plurality of turning arms is supported on one of said lift arm or said adjacent turning arm such that each turning arm is rotatable along a vertical rotational axis, and said turning means has motors for turning said plurality of turning arms.

* * * * *